US012752482B2

(12) United States Patent
Hocke et al.

(10) Patent No.: US 12,752,482 B2

(45) Date of Patent: Oct. 6, 2026

(54) PRINTING DEVICE, PREFERABLY A 3D PRINTER

(71) Applicant: LIQTRA GMBH, Hamburg (DE)

(72) Inventors: Tristan Hocke, Hamburg (DE); Lukas Gross, Neu Wulmstorf (DE)

(73) Assignee: LIQTRA GMBH, Hamburg (DE)

( * ) Notice: Subject to any disclaimer, the term of this patent is extended or adjusted under 35 U.S.C. 154(b) by 324 days.

(21) Appl. No.: 17/917,014

(22) PCT Filed: Apr. 1, 2021

(86) PCT No.: PCT/EP2021/058639

§ 371 (c)(1),
(2) Date: Oct. 5, 2022

(87) PCT Pub. No.: WO2021/204680

PCT Pub. Date: Oct. 14, 2021

(65) Prior Publication Data

US 2023/0182384 A1 Jun. 15, 2023

(30) Foreign Application Priority Data

Apr. 8, 2020 (DE) ..................... 10 2020 109 847.2

(51) Int. Cl.

*B29C 64/209* (2017.01)
*B05C 5/02* (2006.01)

(Continued)

(52) U.S. Cl.

CPC .......... *B29C 64/209* (2017.08); *B05C 5/0225* (2013.01); *B05C 11/1034* (2013.01); *B33Y 30/00* (2014.12); *B41J 2202/13* (2013.01)

(58) Field of Classification Search

CPC ... B29C 64/209; B29C 64/106; B29C 64/112; B29C 64/118; B33Y 30/00;

(Continued)

(56) References Cited

U.S. PATENT DOCUMENTS 5,301,714 A * 4/1994 Johnson ................ B05B 1/3093 137/563

2003/0106594 A1* 6/2003 Saurwein .............. F16K 11/044 137/625.5

(Continued)

FOREIGN PATENT DOCUMENTS

| | | |
|---|---|---|
| CN | 107521103 B | 8/2019 |
| EP | 1972386 B1 | 9/2011 |

(Continued)

OTHER PUBLICATIONS

Translation of Chen, WO 2017206128 A1, originally published 2017 (Year: 2017).*

(Continued)

*Primary Examiner* — Susan D Leong
*Assistant Examiner* — Jennifer L Groux
(74) *Attorney, Agent, or Firm* — Perilla Knox & Hildebrandt LLP

(57) ABSTRACT

A printing device includes at least one printing nozzle designed to eject a flowable material through at least one ejection opening in the direction of a work surface, characterized in that the printing nozzle has a stationary printing nozzle frame and a printing nozzle head including the ejection opening, which printing nozzle head can be moved relative to the printing nozzle frame. The printing nozzle is designed to move the printing nozzle head relative to the printing nozzle frame between an open position, in which a flow of the flowable material through the ejection opening is permitted and a closed position, in which a flow of the flowable material through the ejection opening is not permitted, by means of a drive. The ejection opening of the printing nozzle head is spaced apart further from the work surface in the closed position than in the open position.

13 Claims, 7 Drawing Sheets

(51) Int. Cl.
*B05C 11/10* (2006.01)
*B33Y 30/00* (2015.01)

(58) Field of Classification Search
CPC ... B05C 5/0225; B05C 17/014; B05C 5/0229; B05C 5/0275; B05B 1/304; B05B 1/3066; B05B 1/3046; B05B 1/3093; B05B 1/32; B05B 11/1097; F16K 11/044; F16K 11/048; F16K 11/065; F16K 11/07; F16K 11/0716
See application file for complete search history.

(56) References Cited

U.S. PATENT DOCUMENTS

| | | | | |
|---|---|---|---|---|
| 2016/0009029 | A1 | 1/2016 | Cohen et al. | |
| 2017/0072614 | A1* | 3/2017 | Lind | B29C 64/209 |
| 2018/0281062 | A1* | 10/2018 | Cha | C22C 33/0285 |

FOREIGN PATENT DOCUMENTS

| | | | | |
|---|---|---|---|---|
| EP | 3272669 | B1 | | 11/2019 |
| EP | 3300889 | B1 | | 11/2019 |
| EP | 2151282 | B1 | | 4/2021 |
| JP | 2005296700 | A | | 10/2005 |
| JP | 2010194417 | A | * | 9/2010 |
| JP | 2018103140 | A | | 7/2018 |
| WO | 2017206128 | A1 | | 12/2017 |

OTHER PUBLICATIONS

Espacenet machine translation of Ikushima, JP2005296700A (originally published 2005) (Year: 2005).*

* cited by examiner

PRINTING DEVICE, PREFERABLY A 3D PRINTER

The present invention relates to a printing device, preferably to a 3D printer, according to the preamble of claim 1.

In addition to, for example, primary forming, forming and cutting, the production of workpieces by three-dimensional printing (3D printing) is nowadays known in the field of manufacturing technology. 3D printing can, for example, also be referred to as additive manufacturing. 3D printing is usually understood to mean all manufacturing methods in which materials are applied layer by layer and thus three-dimensional objects are produced as workpieces. In this process, the layered structure made is built up from one or more liquid or solid materials in a computer-controlled manner according to specified dimensions and shapes. During this building process, physical and/or chemical hardening or melting processes take place. Typical materials for 3D printing are plastics materials, synthetic resins, ceramics, and metals.

The advantage of 3D printing is that no special workpiece-specific tools are required to produce the workpiece in its corresponding geometry, as is required, for example, in primary forming using molds. This can increase the flexibility of the production and, in particular in the case of small quantities, keep the production costs low and accelerate the production, since the production of a workpiece-specific casting mold can be dispensed with. In particular, samples, prototypes, and one-offs, where one of the workpieces is to be produced, are therefore nowadays often preferably produced using 3D printing.

Another advantage is that 3D printing can be used to produce workpiece geometries that are not possible with other manufacturing methods. This applies in particular to undercuts and the like.

3D printing as a general generic term comprises various 3D printing technologies which can be differentiated according to the type of material application and the materials that can be used. These 3D printing methods also comprise fused deposition modeling (FDM) in which the workpiece is made out of layers of a meltable material such as, for example, plastics material or metal. Here, a grid of dots or a continuous strip of the material is applied to a usually horizontal work surface by liquefying a wire-shaped plastics material or wax material by heating. The wire-shaped material is fed to a printing head, heated, and liquefied there by extrusion, and applied in liquid or paste form from a printing nozzle of the printing head in the vertical direction from above onto the work surface of a printing bed.

The material is cured on the printing bed, for example, by cooling at the desired position of the horizontal plane of the printing bed. Once a horizontal layer of the workpiece has been produced in this way, either the printing head can be moved vertically up or the work surface can be moved vertically down. The next layer of the workpiece is then applied to the hardened material of the previous layer of the workpiece as previously described. This is repeated for each horizontal layer of the workpiece, resulting in a layered, three-dimensional structure of the workpiece.

EP 3 272 669 A1 relates to a printing device comprising a liquid ejection device designed to eject a liquid contained in a receiving chamber from a ejection opening provided at the receiving chamber. The liquid is provided in a liquid reservoir of a supply portion and is fed under pressure by means of a liquid pump via a line to a corresponding inlet opening of the liquid ejection device or the receiving chamber thereof.

The liquid ejection device comprises a valve element designed to reciprocate vertically within the receiving chamber to the ejection opening to thereby eject the liquid from the ejection opening and then block the ejection opening using a tip part, wherein the receiving chamber is provided with a communication opening, which is designed to hold the liquid supplied by pressure from the supply portion, and is arranged at a position separate from the ejection opening in a direction from the ejection opening to the valve element.

In other words, in a 3D printer according to EP 3 272 669 A1, a liquid can be provided as a flowable material and conveyed from the outside into a printing nozzle that is designed as a liquid ejection device of the printing device and be ejected from there vertically downward, wherein ejection through the stationary ejection opening by means of reciprocating movement of the tip part of the valve element inside the printing nozzle can be permitted or stopped.

The disadvantage of the printing device of EP 3 272 669 A1 is that interrupting the ejection of the liquid through the tip part of the valve element can result in an increase in pressure within the receiving chamber of the printing nozzle. If the ejection opening is opened up again by the tip part of the valve element in order to resume ejection of the liquid, the ejection of the liquid can take place at least initially with a correspondingly increased pressure and thus result in excessive and/or uneven ejection of liquid. With a 3D printer, this can result in an excessive application of material on the horizontal work surface or on the workpiece that has been started, thereby unintentionally changing its shape and even making it unusable.

EP 2 151 282 A1 relates to a basically comparable printing device, which however has a valve element in the printing nozzle which, by means of a lateral movement, i.e., a movement perpendicular to the direction of flow of the material to be ejected, feeds the flow of material to be ejected either downward to the ejection opening or back up into a separate reservoir. Comparable printing devices are shown in EP 1 972 386 A1 and JP 2005 296 700 A.

In this way, it can be avoided that an overpressure builds up inside the printing nozzle due to the interruption of the ejection of the liquid, since the liquid to be ejected can continue to flow when the ejection of the liquid to the outside is interrupted. The disadvantage here, however, is that while the flow direction of the liquid is being switched by the laterally displaceable valve element of the printing nozzle, the flow of liquid is briefly interrupted. This can nevertheless result in pressure fluctuations in the liquid flow within the printing nozzle, at least for a short time.

EP 3 300 889 A1 relates to a printing device which is basically comparable to the printing device of EP 3 272 669 A1. In addition, the possibility of conveying the liquid flow from the receiving chamber back to the supply portion when the tip part of the valve element prevents the liquid from being ejected is described. As a result, a closed circuit of the liquid can be formed.

JP 2018 103 140 A relates to a printing device which is basically comparable to the printing device of EP 3 300 889 A1, since here too the liquid can be discharged from the receiving chamber of the printing nozzle and fed to the supply portion. In contrast to the printing device of EP 3 300 889 A1, however, in the printing device of JP 2018 103 140 A, the flow of liquid both out of the outlet opening of the printing nozzle and into the return line is stopped and released jointly and simultaneously by the tip part of the valve element.

What all the printing devices described above have in common is that the ejection of the liquid from the outlet opening of the printing nozzle of the printing head is always permitted or prevented by a movable element of a valve element, which can be moved either vertically within the receiving chamber of the printing nozzle or horizontally relative to the printing nozzle. The ejection opening of the printing nozzle is in each case designed or arranged in a stationary manner on the printing head and does not perform any movement relative to the printing head when the outlet opening of the printing nozzle is closed or opened by the valve element.

If the printing devices described above are implemented as 3D printers, then this means that the outlet opening of the printing nozzle does not move at all in relation to the horizontal work surface or to the workpiece to be built up in layers on the horizontal work surface when the outlet opening of the printing nozzle is closed or is opened by the valve element. If pressure fluctuations and, in particular, pressure increases, occur in the liquid in the receiving chamber of the corresponding printing nozzle, this can result in at least the smallest amounts of liquid escaping from the outlet opening of the printing nozzle unintentionally reaching the printing bed or the workpiece to be built up in layers on the printing bed and influencing its layered structure. In other words, the structure of the workpiece to be built may be changed and in particular increased, which can at least result in a loss in quality of the workpiece to be built and possibly make it unusable.

As a result, liquid can also emerge uncontrolled and unintentionally from the outlet opening of the printing nozzle and harden there, so that a solid projection projecting vertically downward can form on the printing nozzle. If the printing head is now moved to the next position and the ejection of the liquid is interrupted in the process, which can be referred to as an empty run, a solid projection formed at the outlet opening of the printing nozzle that protrudes vertically downward can collide with an already built-up region of the workpiece to be formed and thus damage the workpiece to be formed. This can increase manufacturing rejects. If this is not recognized at that moment and the 3D printing process continues, the workpiece can be completed and only then recognized as defective. This can result in particular in increased manufacturing costs for the workpieces.

In order to prevent the workpiece to be formed from being damaged due to a solid projection formed at the outlet opening of the printing nozzle, it is known to increase the vertical distance between the workpiece to be formed and the outlet opening of the printing nozzle during empty runs and, for this purpose, to raise the outlet opening of the printing nozzle in the vertical direction relative to the printing bed or to lower the printing bed in the vertical direction in relation to the outlet opening of the printing nozzle. However, this means an additional expense, which can cost time and/or electrical energy. This can increase the manufacturing time of the workpiece, which is usually undesirable. This can also increase wear and/or heating of the drives involved.

One object of the present invention is to provide a printing device of the type described above, so that the manufacturing quality of the workpieces to be manufactured can be increased. Additionally or alternatively, the manufacturing costs of the workpieces to be manufactured is to be reduced. Additionally or alternatively, the manufacturing time of the workpieces to be manufactured is to be reduced. Additionally or alternatively, the range of materials that can be used is to be increased. At least an alternative to known printing devices of this type is to be provided.

The object is achieved according to the invention by a printing device having the features of claim 1. Advantageous further developments are described in the dependent claims.

The present invention thus relates to a printing device, preferably a 3D printer, comprising at least one printing nozzle which is designed to eject a flowable material through at least one ejection opening in the direction of a work surface which is preferably horizontal. The flowable material can be any flowable and/or conveyable material that is suitable for the corresponding application to carry out a printing process and to produce a printed product. For a 3D printing process, these can in particular be the materials mentioned above. In particular, a three-dimensional workpiece can be produced by printing, as described above, using the flowable material. The workpiece can be formed on the work surface, in particular, in the vertical direction.

The printing device according to the invention is characterized in that the printing nozzle has a stationary printing nozzle frame and a printing nozzle head comprising the ejection opening, which printing nozzle head is movable, preferably in the vertical direction, relative to the printing nozzle frame. In other words, the ejection opening, which can also be referred to as the nozzle opening, is arranged on the movable printing nozzle head. For this purpose, the ejection opening can be formed by the printing nozzle head or can be arranged as a separate component on the printing nozzle head.

The printing nozzle is designed to move the printing nozzle head relative to the printing nozzle frame, preferably in the vertical direction, between an open position, in which a flow of the flowable material through the ejection opening is permitted, and a closed position, in which a flow of the flowable material through the ejection opening is not permitted, by means of a drive, preferably by means of a piezoelectric or pneumatic drive, wherein the ejection opening of the printing nozzle head is spaced apart further from the work surface in the closed position than in the open position.

In other words, the ejection opening is moved with the printing nozzle head relative to the stationary printing nozzle frame, so that each time the ejection opening is closed, the distance between the ejection opening and the work surface or the workpiece being printed there also simultaneously increases. Not only can this prevent the printing or ejection of the flowable material through the ejection opening or out of the ejection opening, but the distance between the ejection opening and the work surface and in particular the workpiece being printed there can simultaneously also be increased. This can ensure or at least increase the probability that the work surface or the workpiece being printed no longer comes into contact with the ejection opening or its edge and any flowable or hardened portion of the flowable material located there, which may result in the corresponding disadvantages and problems described above. Rather, a sufficient distance between the ejection opening and the work surface or the workpiece can be ensured in order to avoid this.

Performing this movement away from the work surface together with the closing movement of the ejection opening as a single movement can speed up the movement or save time. This can be particularly advantageous in the case of highly dynamic printing processes and can save processing time. This can be made possible or further accelerated in particular by using a piezoelectric drive, while a pneumatic drive can bring about this movement in a comparable manner, but usually with less dynamics, but at the same time at lower costs for the technical components required. Also, by performing two functions with a single movement, namely closing and spacing apart, the effort required for this can be kept low. This can have a cost-saving, an energy-saving and/or a space-saving effect on the printing device in each case and in particular when combined.

In particular during empty runs over the work surface or over the component or workpiece to be printed, the movement and in particular the vertical movement of the printing nozzle head relative to the printing nozzle frame can ensure that regions of the workpiece that have already been printed are not damaged. A hitherto common movement of the printing head along the Z-axis during empty runs can thus be omitted.

According to one aspect of the invention, the printing nozzle frame has at least one sealing surface and the printing nozzle head has at least one sealing surface, which are formed opposite one another such that, in the open position, the two sealing surfaces are spaced apart from one another and form a transition region between them through which the flow of the flowable material toward the ejection opening is allowed, and in the closed position, the two sealing surfaces form a seal together so that the flow of the flowable material between the two sealing surfaces toward the ejection opening is not permitted. In this way, a simple and effective sealing can be implemented in the closed position and an opening can be implemented in the open position. In particular, this can simplify the manufacture and/or implementation of the sealing function in the closed position. The term “sealing surface” also comprises a very narrow, linear surface, which can also have a sealing effect.

According to a further aspect of the invention, the two sealing surfaces are designed to touch one another in a planar or linear manner in the direction of movement or at an angle or at right angles to the direction of movement of the printing nozzle head relative to the printing nozzle frame. In particular, the two sealing surfaces can be implemented by a pairing of straight, curved, conical, and/or spherical sealing surfaces. This can increase the design options for the sealing function in the closed position. This can also improve the sealing effect between the two sealing surfaces and make the process more reliable. This can apply in particular to conical sealing surfaces.

However, curved, conical, and/or spherical sealing surfaces can have the disadvantage that, due to components of the printing nozzle frame and/or the printing nozzle head reaching around or behind one another, these might have to be made in multiple parts and might have to be connected to one another during assembly of the printing nozzle. This can increase the cost of manufacturing and/or assembly of these components. This can also increase the permissible manufacturing and/or assembly tolerances.

On the other hand, sealing surfaces that are designed at right angles to the direction of movement of the printing nozzle head relative to the printing nozzle frame can avoid such a gripping around or behind, so that the printing nozzle frame and the printing nozzle head can be produced in one piece, which may simplify manufacture and/or assembly and/or an increase in the permissible manufacturing and/or assembly tolerances.

Depending on the geometry of the printing nozzle frame and/or the printing nozzle head, this can bring about the desired tightness and/or be easy, quick, and/or to implement or produce. A planar contact of the two sealing surfaces can already achieve the desired sealing effect, in particular with a rather highly viscous flowable material, and can be comparatively simple to form and/or be low-wear due to the comparatively uniform distribution of the pressure or contact forces. A linear contact of the two sealing surfaces can achieve a higher sealing effect due to a higher surface pressure of the two sealing surfaces, which can be advantageous or necessary in the case of low-viscosity, flowable materials.

According to a further aspect of the invention, the printing nozzle frame has at least two sealing surfaces and the printing nozzle head has at least two sealing surfaces, which are each formed in pairs opposite one another, such that, in the open position, the one pair of sealing surfaces is spaced apart from one another and forms a transition region therebetween, through which the flowable material is permitted to flow toward the ejection opening and seals together the other pair of sealing surfaces, so that the flowable material is not permitted to flow toward an outlet opening therebetween through the two sealing surfaces, and, in the closed position, seals together the one pair of sealing surfaces, so that the flowable material is not permitted to flow toward the ejection opening between the two sealing surfaces, and the other pair of sealing surfaces is spaced apart from one another and forms a transition region therebetween, through which the flowable material is permitted to flow toward the outlet opening.

In other words, the two pairs of sealing surfaces between the printing nozzle frame and the printing nozzle head mutually interact in such a way that the flowing material can either reach the ejection opening and be ejected through a transition region between the one, first pair of sealing surfaces, as described above, or can get to an outlet opening of the printing nozzle through a transition region between the other, second pair of sealing surfaces. The flowing flowable material can escape from the printing nozzle via the outlet opening of the printing nozzle without getting to the work surface. In particular, the flowing flowable material can be collected or received in a receiving space or fed back via the return line to the flowing flowable material that is fed to the printing nozzle, as will be described in more detail below.

In any case, the flowing of the flowable material can be maintained regardless of whether the flowing flowable material is fed to the ejection opening of the printing nozzle head of the printing nozzle or to the outlet opening of the printing nozzle. This can make it possible not to have to move the stationary flowable material when changing from the closed position to the open position or to have to feed a material pressed against a resistance, i.e., a pressurized, stationary flowable material, to the ejection opening of the printing nozzle head. In the first case, this can result in a delay in the ejection and possibly in an insufficient ejection of the flowable material, which degrades the printed design and, in the case of 3D printing, may form the workpiece to be produced insufficiently and make it unusable. In the second case, this can result in a deteriorated printed image due to excessive, jerky discharge due to too much flowable material being ejected and, in the case of 3D printing, to an excessively formed workpiece, and can also make it unusable.

According to the invention, this can be prevented in each case by feeding the continuously flowing flowable material either to the ejection opening of the printing nozzle head or to the outlet opening of the printing nozzle, so that, when the ejection opening of the printing nozzle head is closed, the stream of flowing flowable material does not have to be stopped or changed in its flow rate. If the open position is then assumed, the flowable material is already available in a flowing state without the pressure fluctuations described above, which may facilitate a consistent printed image or a workpiece formed by 3D printing.

According to a further aspect of the invention, the two pairs of sealing surfaces are designed to touch one another in a planar or linear manner in the direction of movement or at an angle or at right angles to the direction of movement of the printing nozzle head relative to the printing nozzle frame. This can allow for the implementation and use of the corresponding properties and advantages already described above for both pairs of sealing surfaces.

According to a further aspect of the invention, the printing device has at least one receiving space, preferably a printing head, which is designed to receive the flowable material from the outlet opening of the printing nozzle, and/or at least one return line, preferably a printing head, which is designed to hold the flowable material from the outlet opening of the printing nozzle and to feed it to an inlet opening of the printing nozzle. In the first case, the flowable material—which is discharged unused in the closed position of the printing nozzle from this printing nozzle to the outside into the receiving space as a collecting container—can be collected there and removed by a user, for example after the end of the printing process, and disposed of or prepared for reuse. In the second case, the flowing flowable material can at least be admixed, preferably as soon as possible, to the material flow into the printing nozzle in order to allow for direct reuse. In particular, the reuse of the flowable material discharged from the printing nozzle, whether immediately or after removal from the receiving space, can reduce the material costs of the printing process.

According to a further aspect of the invention, the transitions between the two pairs of sealing surfaces are each designed to keep the flow of the flowable material constant. In other words, the pairs of sealing surfaces or the printing nozzle frame and the printing nozzle head can be designed in the region of the sealing surfaces such that the transition region of one first pair of sealing surfaces increases at least substantially to the extent by which the transition region of the other second pair of sealing surfaces is simultaneously reduced. This can keep the flow rate or the pressure of the flowing flowable material as constant as possible during the respective switching between the open position and the closed position and thereby avoid a change in the flow of the flowable material, which could otherwise result in the previously described disadvantages of a reduced or excessive ejection of the flowing flowable material.

According to a further aspect of the invention, the printing nozzle frame and/or the printing nozzle head has/have at least substantially the same flow resistance for the flowable material between a transition region, which forms in the open position between the printing nozzle frame and the printing nozzle head, and the outlet opening, and between a transition region, which forms in the closed position between the printing nozzle frame and the printing nozzle head, and the ejection opening. In other words, the regions of the printing nozzle frame and/or the printing nozzle head which immediately adjoin the transition regions are designed to be as similar as possible in terms of their flow resistance. This can also facilitate a flow of the flowing flowable material that is as consistent as possible when switching between the open position and the closed position.

According to another aspect of the invention, the ejection opening is designed to be narrowed. This can cause an increase in pressure of the flowable material immediately before it is ejected from the ejection opening in order to specifically influence the ejection process. This can be specifically influenced by the geometry of the ejection opening and in particular by its contour and/or size.

According to a further aspect of the invention, the printing device has at least one metering pump which is designed to have the flowable material supplied through an inlet opening and to feed it through an outlet opening to the printing nozzle, the metering pump having at least a first chamber volume and a second chamber volume, each of which can be alternatively connected to the inlet opening or to the outlet opening to convey the flowable material. A metering pump of this type can also be referred to as a double piston pump or axial piston pump. In any case, this can make it possible to first feed the flowable material from a source of the printing device, as will be described in more detail below, to the metering pump, to increase the pressure of the flowable material there to a predetermined pressure within a chamber volume, and to feed the flowable material at this specified pressure to the printing nozzle while the other chamber volume is being filled with further flowable material from the source. This may allow for the flowable material to be provided closer to the printing nozzle than by the source of flowable material. In particular, the metering pump and the printing nozzle can be arranged together on a printing head, which can facilitate the implementation of the properties and/or advantages described above.

According to a further aspect of the invention, the two chamber volumes are arranged in a straight line opposite one another, wherein the two chamber volumes face one another and are separated from one another by a valve element, wherein the two chamber volumes face away from one another and are each delimited by a corresponding piston, wherein the two pistons are fixedly connected to one another by means of a piston linkage in order to be translationally moved together in the same direction. This can allow or simplify implementation, in particular as a double-piston pump.

According to a further aspect of the invention, the two pistons are designed to be translationally moved together in the same direction by means of a piston drive and by means of the pressure of the flowable material. This can relieve the drive from having to apply the required pressure to the flowable material in the one first chamber volume, which is fluidly connected to the outlet opening of the metering pump, as a result of which the piston drive can be designed to be less powerful, smaller, lighter, and/or more energy-efficient. Rather, the pressure of the flowable material flowing into the other second chamber volume, which is flowably connected to the inlet opening, can be transferred from the piston of the second chamber volume to the piston of the first chamber volume by means of the aforementioned piston linkage. This can relieve the piston drive accordingly.

According to a further aspect of the invention, the valve element is designed to be rotated by means of a valve drive perpendicular to the translatory direction of movement of the two pistons. This may allow switching between at least two positions to alternately connect either the first chamber volume to the inlet opening of the metering pump and simultaneously the second chamber volume to the outlet opening of the metering pump to convey the flowing material, or vice versa. In particular, this can be implemented in a comparatively direct, simple, and/or space-saving manner by means of a rotary movement.

According to a further aspect of the invention, the piston linkage is arranged outside of the two chamber volumes. This can allow the implementation of the previously described coupling of the two pistons without having to guide the piston linkage through the two chamber volumes, which would require appropriate seals. And this would have to be taken into account when designing the pistons. Furthermore, said guiding of the piston through the chamber volumes could prevent or at least complicate the implementation of the valve element as a rotatable valve element. This can be avoided by arranging the piston linkage outside of the two chamber volumes.

According to a further aspect of the invention, the printing device has at least one plasticizing unit, preferably at least one plasticizer, which is arranged stationary relative to the printing nozzle and is designed to produce the flowable material, wherein the plasticizing unit is connected to the printing nozzle by means of at least one, preferably hose-like, material guide element which is designed to convey the flowable material, wherein the material guide element is preferably designed to be heatable.

This aspect of the invention is based on the finding that all the printing devices described above, and in particular 3D printers, also have in common that the material to be liquefied is usually fed in the form of a wire-shaped material, for example a plastics material, from a material store that is stationary relative to a frame of the 3D printer, via a hose-like material feed line, to the printing head. The printing head has the plasticizer mentioned above, which plasticizes the plastics material fed to it and directs it as a liquid into the receiving chamber of the printing head, from where the liquid can be discharged vertically downward, as described above, via the outlet opening of the printing nozzle for the layered build of the workpiece. For this purpose, the printing head can usually be moved horizontally. Vertical movement can also occur on the part of the printing head or the horizontal work surface.

The disadvantage here is that the plasticizer has to be moved jointly with the printing head. Thus, the printing head has a comparatively large weight. This requires a correspondingly massive build for the printing head and its holder. The drives must also be designed accordingly in order to be able to move the printing head holder or the printing head together with the plasticizer. Overall, this increases the size, weight, energy consumption, and/or heating-up of 3D printers of this type.

The particular disadvantage here is that the printing head together with the plasticizer has a correspondingly high inertia which has to be accelerated and braked during the movement. Since 3D printing of the workpiece usually takes place with many quick movements in order to move the outlet opening of the printing nozzle of the printing head horizontally within the layer of the workpiece to be built, the inertia of the printing head including the plasticizer can be a limiting factor in the printing speed. The inertia of the printing head to be accelerated and braked, together with the plasticizer, can also result in the already mentioned comparatively high consumption of electrical energy with a correspondingly large heating-up of the drives. This can possibly necessitate active cooling of the drives, which in turn can increase the weight, the installation space, the costs, and/or the energy consumption.

According to the invention, therefore, the plasticizing unit, which can also be referred to as the plasticizer, can be arranged in a stationary manner on the frame and thus so as not to move jointly with a movable printing head and the printing nozzle thereof. This can significantly reduce the weight, the installation space, and/or the inertia of the printing head to be moved, which can have a corresponding effect on the printing head itself and its movement kinematics in terms of space, cost, and/or energy savings.

Instead, the plasticizing unit can be arranged and operated in a stationary manner, which, e.g., can also be done by means of granulate. This can reduce the material cost of the flowable material and/or increase the range of flowable materials that can be used. The material can then be brought into the flowable state in the plasticizing unit and can be conveyed via the material guide element that is designed, for example, as a hose to the printing head by heating by means of a, preferably electrical, heating in combination with heating of the material by means of its internal friction through the rotary movement of a screw of the plasticizing unit with simultaneous compression of the material. At the printing head, the flowing flowable material can then be used and ejected for printing, as described above, immediately or after an increase in pressure by the metering pump described above.

The use of a hose as the material guide element can increase its flexibility so that the material guide element can be connected to a moving printing head. Designing the material guide element to be simultaneously or alternatively heatable and, in particular, electrically heatable can make it possible for the material made flowable by heating to be kept flowable by the adjustable heat of the heatable material guide element. Electrical heating can be particularly simple, space-saving, and/or precisely and/or uniformly adjustable.

In other words, the invention is based on the idea of providing a printing device, in particular for 3D printing using the FDM method, which can use commercial thermoplastic granules in particular instead of the filaments that have been customary up to now. The advantages of a lower material price of the flowable material, a higher material throughput of the flowable material, a larger material selection of the flowable material, and/or a higher component quality of the 3D-printed workpiece can be seen here.

Using the printing device according to the invention, in particular a granulate can be melted with a commercially available plasticizer. This plasticizer can be installed in a stationary manner in the printing device and thus so as to not be moved jointly with the printing head as is usual for printing devices described above. The printing bed as a horizontal work surface and thus the workpiece to be printed are preferably not moved in the horizontal plane either.

For example, the thermoplastics melt as a flowable material can preferably be fed via a flexible melt line, for example in the form of a heating hose, to the printing head which can, for example, be moved and positioned by means of highly dynamic kinematics in the horizontal plane and in the vertical direction relative to the work surface and the workpiece to be printed. Alternatively, the flowable material can also be supplied via a rigid melt line, e.g., in the form of tubes having pivoting joints or scissor joints, which can preferably also be heated. Flexible and rigid line elements can also be used in combination with one another.

The printing head can have the metering pump and printing nozzle described above as the shut-off nozzle. The metering pump can be able to deliver the appropriate amount of flowable material into the shut-off nozzle depending on the movement of the printing head. From there, the flowable material can be applied to the printing bed or to the component or workpiece. In order to realize a starting of material discharge from the ejection opening of the printing nozzle at the beginning and a stopping of material discharge from the ejection opening of the printing nozzle at the end of a web, the printing nozzle can have a locking mechanism which simultaneously moves the printing nozzle in the vertical direction upward out of the printing plane to protect previously printed regions of the workpiece.

In the printing device according to the invention, the printing nozzle or the shut-off nozzle can represent a substantial component in order to start and stop the flow of flowable material from the ejection opening of the printing nozzle and thus to generate a clean printed design. The design of the printing nozzle or the shut-off nozzle is based on the knowledge that a defined termination of the material discharge from the ejection opening of the printing nozzle head could not be ensured simply by changing the conveying speed of the flowable material, e.g., on the part of the plasticizing unit. On the one hand, the dynamics of the plasticizing unit and its drive as well as the metering pump can be too sluggish for this purpose. On the other hand, the material column of the flowable material in the material guide element, for example in the heatable hose between plasticizer and printing nozzle, can have an elasticity, for example due to the viscoelastic behavior of a polymer melt, so that a "sharp/steep" pressure drop to stop and a "sharp/steep" pressure increase to start the ejection of the flowable material from the ejection opening of the printing nozzle cannot be achieved by the plasticizing unit alone.

According to the invention, the printing nozzle described above can therefore be used, in particular in combination with a stationary plasticizing unit. The ejection opening of the printing nozzle, which is designed as a nozzle opening from which the flowable material can be applied to the component or workpiece, can be closed to stop the material discharge. The closing movement of the printing nozzle head relative to the printing nozzle frame, preferably inside the printing nozzle frame, can preferably simultaneously open up a connection or a passage region to an outlet through which the flowable material can flow out of the printing nozzle. The flow of material is thus preferably not stopped during the closing process of the ejection opening of the printing nozzle. Therefore, the printing nozzle head can also be referred to as a switching valve. The outlet preferably has the same flow resistance as the nozzle for applying the flowable material to the component or to the workpiece. As a result, when the material flow is switched, there may be only a small or no change in pressure in the melt being conveyed.

After the switching process by the printing nozzle has ended, the material flow through the plasticizer can be stopped with a correspondingly slower characteristic without having a negative impact on the print quality. In the opposite case, when starting the material discharge onto the component, the plasticizer having slow characteristics can start the material flow when the ejection opening of the printing nozzle is closed. In this state, the flowable material can preferably be conveyed into a return line via the outlet. Once a defined flow of material has formed and the pressure conditions in the melt have stabilized, the material discharge onto the component can be started by switching the movable printing nozzle head of the printing nozzle. The flow resistances inside the printing nozzle can preferably be designed such that no pressure change occurs in the melt even during this switching process. This can result in a clean printed design.

If the printing device according to the invention is implemented with a separate, stationary plasticizer, there can be a relatively long supply line in the form of the material guide element with a correspondingly long material column in its interior. As a result, due to the elasticity of the melt in the feed line, i.e. due to the viscoelastic behavior of a polymer melt, it may not be possible to reliably realize the metering of the material discharge from the ejection opening of the printing nozzle with the required accuracy by actuating the plasticizing unit, as already described above. Therefore, the use of a separate metering pump can preferably be provided, as previously described. Said metering pump can have a significantly lower weight in relation to the plasticizing unit and can therefore be moved together with the printing nozzle on the printing head. As a result, the volume of the material column between the metering pump and the printing nozzle can be significantly reduced, which can result in corresponding advantages in terms of print quality.

The metering pump can be implemented in the functional principle of a double-acting piston pump. There are two separate chamber volumes and a valve through which the melt as a flowing material can flow from the plasticizing unit to one of the two chambers and from the other chamber to the printing nozzle. As soon as one of the two chambers is emptied, the material flow can be switched using the valve. Two pistons, which together with a cylinder form the chamber volume, can be non-positively connected to one another. In contrast to conventional arrangements, the non-positive connection may not take place via a common piston rod within the chamber volume but rather via at least one tie rod outside the chamber volume. This eliminates the need for additional sealing surfaces for shaft seals on the piston rods. The non-positive connection of the piston rod can have the advantage that the pressure of the melt provided by the plasticizing unit forms a force component that supports the force that is necessary to apply the necessary pressure for the material discharge from the ejection opening of the printing nozzle. As a result, a piston drive of the metering pump can be selected to be correspondingly smaller, which can result in advantages with regard to the weight and thus the moving masses of the printing head. A variant may also be conceivable which, with appropriate design of the valve and the activation of the piston rods, allows continuous material discharge without an explicit switchover time.

In any case, the advantages of an easy-to-implement structure can be partially or fully achieved, comprising only a few sealing surfaces, a relief of the drive through the supportive pressure of the melt, short switchover times, since one chamber is emptied and the other chamber is filled in parallel, as well as shorter distances and therefore less volumes between the chamber volume and the ejection opening of the printing nozzle as a shut-off nozzle.

An arrangement of a plurality of pistons and corresponding cylinder volumes is also conceivable, in which the pistons are arranged in parallel in a circular pattern. The linear movement can then be effected by linkage with a swashplate or cam disk, so that at least one piston is always moving forward and discharging material, while at least one piston is moving backward and replenishing material from the plasticizer.

As a result, with a corresponding linkage angle, the force required for discharge can also be supported by the pressure of the melt from the plasticizing unit, even if possibly not to the full extent as in the previously described arrangement. The activation of the individual cylinder volumes can be realized, for example, by a type of valve disk, which can contain corresponding bores. With this structure, a continuous and, with an appropriate design of the linkage, pulsation-free discharge could be realized. As a result, no point in time for switching the valve would have to be provided in the process and continuous material discharge could be implemented.

A plurality of embodiments and further advantages of the invention are illustrated purely schematically and are explained in greater detail below in connection with the following drawings, in which.

The above figures are viewed in Cartesian coordinates. It extends in a longitudinal direction (not shown), which can also be referred to as depth or length. A transverse direction Y, which may also be referred to as the horizontal direction Y, extends perpendicularly to the longitudinal direction. A vertical direction Z, which may also be referred to as the height Z, extends perpendicularly to both the longitudinal direction and the transverse direction Y. The longitudinal direction and the transverse direction Y together form the horizontal, which may also be referred to as the horizontal plane.

Figure 1:
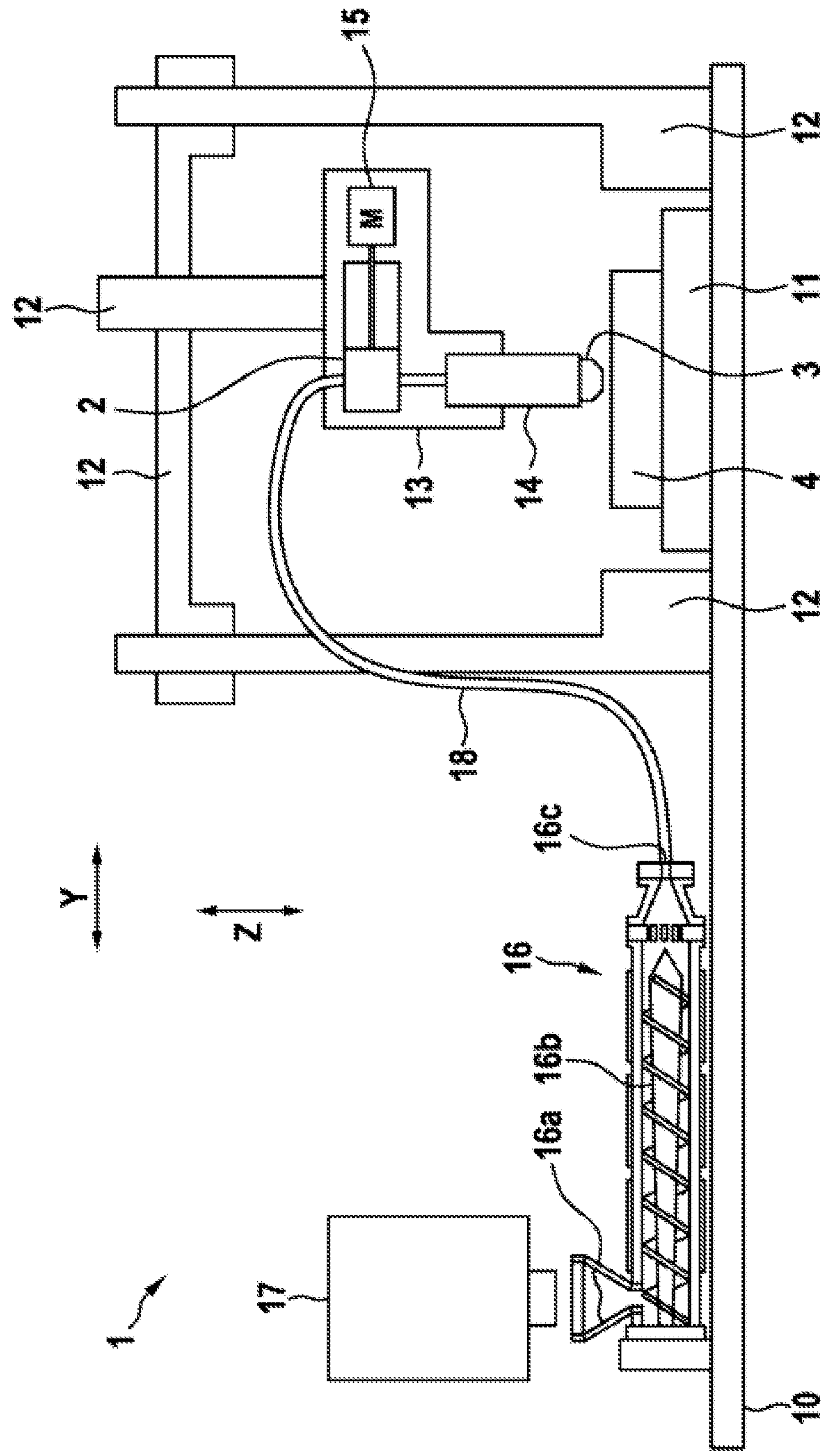
FIG. 1 is a side view of a printing device according to the invention as a 3D printer.

FIG. 1 is a side view of a printing device 1 according to the invention as a 3D printer 1. The 3D printer according to the invention 1 has a frame 10, which may also be referred to as a rack 10. The frame 10 can be used to place the 3D printer 1 on a base (not shown) in order to be operated. Further components and elements of the 3D printer 1 are arranged on the frame 10.

For example, a plasticizing unit 16 in the form of a plasticizer 16 is arranged in a stationary manner on the frame 10, shown on the left in FIG. 1. A material to be plasticized can be fed from a material store 17 to the plasticizer 16 in the vertical direction Z from above, for example, as granulate or the like, by letting the granulate, e.g., a plastics material, fall into a funnel **16*a* of the plasticizer 16 and by it being able to be heated there inside the plasticizer 16 by means of a screw 16*b* by pressure and additional heating and thus be made flowable. The flowable material can then be discharged from the plasticizer 16 via an outlet opening 16*c* or via a nozzle opening 16*c* of the plasticizer 16**.

On the right side of FIG. 1, a horizontal work surface 11 is arranged in the vertical direction Z on top of the frame 10, which horizontal work surface may also be referred to as a printing bed 11. Printing head kinematics 12 are arranged horizontally next to the printing bed 11 and consist of vertical and horizontal drive elements (not shown in detail) which can be moved vertically and horizontally with respect to the frame 10 and with respect to one another. A printing head holder 13 can be moved and positioned in the vertical direction Z above the printing bed 11 by means of the printing head kinematics 12. The printing head holder 13 is connected to the nozzle opening **16*c* of the plasticizer 16 by means of a hose-like, heatable material guide element 18 in the form of a heating hose 18 such that the flowable material can be dispensed from the plasticizer 16 via the heating hose 18 to the printing head holder 13**.

A metering pump 2 according to the invention in the form of a piston conveyor 2, to which the flowable material can be fed by means of the heating hose 18, is arranged inside the printing head holder 13. The flowable material can be dispensed to a printing head 14 at a specified pressure by means of the metering pump 2, as will be described in more detail below with reference to FIG. 12. This can take place by means of the pressure of the flowable material itself as well as by means of the pressure which can be generated in the metering pump 2 by means of a piston drive 15 of the metering pump 2. The piston drive 15 is also arranged on the printing head holder 13.

The printing head 14 can output or eject the flowable material in the vertical direction Z downward onto the printing bed 11 in order to form a workpiece 4 on the printing bed 11 in the horizontal and in the vertical direction Z by printing upward and in layers. The flowable material is ejected by means of a printing nozzle 3 of the printing head 14 according to the invention, which can also be referred to as a nozzle 3 of the printing head 14. Various embodiments of the printing nozzle 3 will be explained in more detail below with reference to FIGS. 2 to 11.

In any case, the 3D printer 1 according to the invention makes it possible to dispense with moving the plasticizer 16 with the printing head 14 or with the printing head holder 13, which may significantly reduce the mass of the printing head holder 13 that the printing head kinematics 12 must support and move. Instead, the plasticizer 16 can be arranged in a stationary manner and the flowable material can be fed to the printing head 14 in a flowable manner by means of the heating hose 18. This can also make it possible to use granulate instead of wire-shaped materials, as a result of which the selection of materials that can be used can be increased and/or their costs can be reduced. Despite the comparatively long path of the flowable material through the heating hose 18, the pressure of the flowable material within the printing nozzle 2 that is required or optimal for printing can be ensured by the metering pump 2.

According to the invention, the flowable material can be ejected through the printing nozzle 3 of the printing head 14 such that the printing nozzle 3 consists substantially of a printing nozzle frame 30 as the nozzle body 30 and of a printing nozzle head 31 as the nozzle needle 31, see FIGS. 2 to 11. According to the invention, the printing nozzle frame 30 is arranged stationary on the printing head 14 and the printing nozzle head 31 is arranged so as to be moved relative to the printing nozzle frame 30 in the vertical direction Z. An ejection opening 32 of the printing head 14 as a nozzle opening 32 of the printing head 14 is formed by the movable printing nozzle head 31 so that the ejection opening 32 of the printing nozzle head 31 can be moved in the vertical direction Z relative to the stationary printing nozzle frame 30.

As a result, by moving in the vertical direction Z upward, the ejection opening 32 of the printing nozzle head 31 can be simultaneously changed from an open position—which allows the flowable material to be ejected in the vertical direction Z downward toward the printing bed 11 or toward the workpiece 4 to be printed and positions the ejection opening 32 of the printing nozzle head 31 in the vertical direction Z closer to the printing bed 11 or to the workpiece 4 to be printed—to a closed position of the ejection opening 32 of the printing nozzle head 31, which prevents the flowable material from being ejected in the vertical direction Z downward to the printing bed 11 or to the workpiece 4 to be printed and positions the ejection opening 32 of the printing nozzle head 31 further away from the printing bed 11 or from the workpiece 4 to be printed in the vertical direction Z. By moving the printing nozzle head 31 in the vertical direction Z relative to the printing nozzle frame 30 between the open position and the closed position, an enabling or preventing of the ejection of the flowable material at the height Z downward and a closer or further spacing apart of the ejection opening 32 of the printing nozzle head 31 to the printing bed 11 or to the workpiece 4 to be printed can occur together.

In the closed position of the ejection opening 32 of the printing nozzle head 31, the further spacing apart of the printing nozzle head 31 from the printing bed 11 or from the workpiece 4 to be printed can ensure that contact between the ejection opening 32 of the printing nozzle head 31 and the printing bed 11 or the workpiece to be printed 4, in particular during the displacement movement of the printing head 14 in the horizontal, can be reliably prevented without the printing head 14 having to be moved as a whole in the vertical direction Z for this purpose. This can avoid the corresponding effort and still protect the printing bed 11 or the workpiece 4 to be printed from colliding with the ejection opening 32 of the printing nozzle head 31. This movement of the printing nozzle head 31 in the vertical direction Z relative to the printing nozzle frame 30 can, for example, take place in a piezoelectric or pneumatic manner (not shown).

Figure 2:
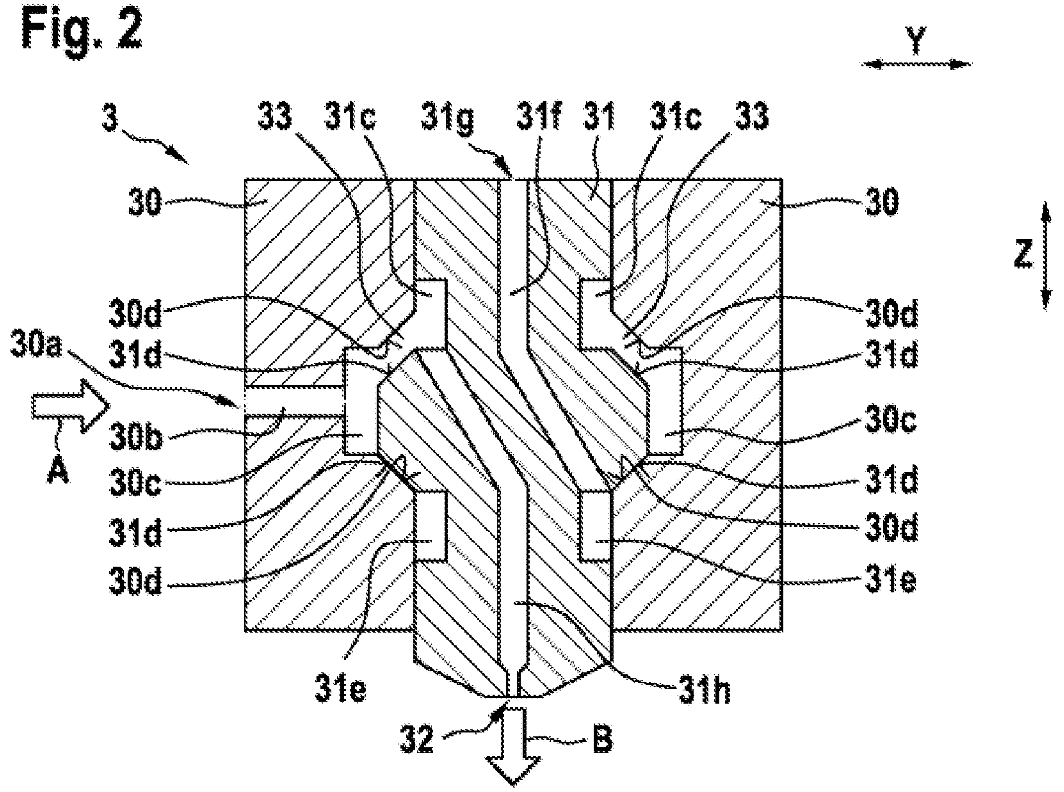
FIG. 2 is a sectional view of a printing nozzle according to the invention according to a first embodiment in the open position.
Figure 3:
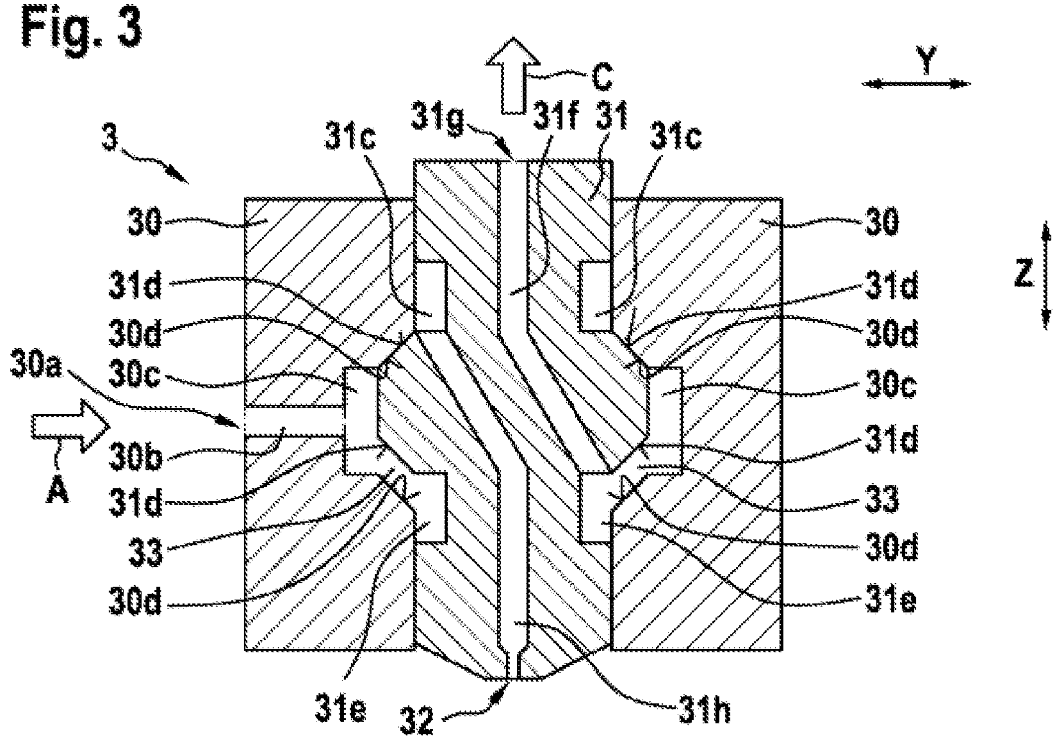
FIG. 3 is the view of FIG. 2 in the closed position.

The mobility of the ejection opening 32 of the printing nozzle head 31 in the vertical direction Z in relation to the printing nozzle frame 30 arranged stationary on the printing head between the open position and the closed position can be structurally enabled in various ways, as is explained in more detail below by way of example:

FIG. 2 is a sectional view of a printing nozzle 3 according to the invention according to a first embodiment in the open position. FIG. 3 shows the view of FIG. 2 in the closed position.

In this case, the previously mentioned stationary printing nozzle frame 30 is arranged on the outside around the substantially cylindrical printing nozzle head 31 that is movable in the vertical direction Z relative to the printing nozzle frame 30. In the view of FIGS. 2 and 3 on the left, the printing nozzle frame 30 has an inlet opening 30*a* which can receive the flowable material from the metering pump 2, as previously described. A straight, cylindrical inlet channel 30*b* extends radially on the inside from the inlet opening 30*a* into the printing nozzle frame 30 and merges into an inlet ring 30*c* which extends in a closed ring shape around the printing nozzle head 31 and in the vertical direction Z on both sides beyond the inlet channel 30*b*. The upper and lower edges of the inlet ring 30*c* in the vertical direction Z each transition conically at an angle of 45° into the through-opening (not designated) of the printing nozzle frame 30 which accommodates the printing nozzle head 31. These two conical surfaces represent two sealing surfaces 30*d* of the printing nozzle frame 30.

As already mentioned, the printing nozzle head 31 is of substantially cylindrical design and can be moved in the vertical direction Z relative to the printing nozzle frame 30, e.g., by means of a piezoelectric or pneumatic drive (not shown). The printing nozzle head 31 has a trapezoidal projection (not designated) approximately centered in the vertical direction Z, which points in the vertical direction Z conically at an angle of 45° each at the top and bottom toward the inlet ring 30*c* of the printing nozzle frame 30. These two conical surfaces represent two sealing surfaces 31*d* of the printing nozzle head 31 and correspond to the two sealing surfaces 30*d* of the printing nozzle frame 30, so that the upper and lower sealing surface 31*d* of the printing nozzle head 31 can each sealingly abut against and act sealingly in pairs against the corresponding upper and lower sealing surface 30*d* of the printing nozzle frame 30.

The sealing surface 31*d* of the printing nozzle head 31 which is on top in the vertical direction Z transitions upward in the vertical direction Z, facing away from the projection, into an inlet ring 31*c* of the printing nozzle head 31, which ring extends in a closed ring shape around the printing nozzle head 31 and in an open manner radially outward along the vertical direction Z beyond the upper sealing surface 31*d* of the printing nozzle head 31 facing away from the projection. The inlet ring 31*c* of the printing nozzle head 31 is connected at one point to an ejection channel 31*h* which initially extends obliquely to the central axis of the printing nozzle head 31 and from there in a straight line along the central axis of the printing nozzle head 31 in the vertical direction Z downward to the ejection opening 32. The ejection opening 32 of the printing nozzle head 31 is designed to be narrowed with respect to the ejection channel 31*h*, whereby an increase in pressure of the flowable material can be caused immediately before ejection.

Comparably, the sealing surface 31*d* of the printing nozzle head 31, which is on the bottom in the vertical direction Z, transitions downward in the vertical direction Z, away from the projection, into an outlet ring 31*e* of the printing nozzle head 31, which ring also extends in a closed ring shape around the printing nozzle head 31 and in an open manner radially outward in the vertical direction Z beyond the lower sealing surface 31*d* of the printing nozzle head 31, facing away from the projection. The outlet ring 31*e* of the printing nozzle head 31 is connected at one point to an outlet channel 31*f*, which initially extends obliquely to the central axis of the printing nozzle head 31 and from there in a straight line along the central axis of the printing nozzle head 31 in the vertical direction Z upward to an outlet opening 31*g* of the printing nozzle head 31. The outlet opening 31*g* of the printing nozzle head 31 can be connected to a receiving space (not shown) of the printing head 14, where the flowable material can be received and stored. Alternatively, the outlet opening 31*g* of the printing nozzle head 31 can be connected to a return line (not shown) in order to feed the flowable material to the metering pump 2 and from there back to the inlet opening 30*a* of the printing nozzle frame 30 and to reuse it.

Alternatively, the ejection channel 31*h* could also be Y-shaped in the upper region and connected to the inlet ring 31*c* of the printing nozzle head 31 at two diametrically opposite points. In this case, the outlet channel 31*f* of the printing nozzle head 31 would have to be arranged offset laterally or in the circumferential direction with respect to the ejection channel 31*h* of the printing nozzle head 31. If the outlet channel 31*f* of the printing nozzle head 31 is also designed to be Y-shaped, so that the outlet channel 31*f* of the printing nozzle head 31 is connected to the outlet ring 31*e* of the printing nozzle head 31 at two diametrically opposite points, the two Y-shaped portions of the ejection channel 31*h* of the printing nozzle head 31 could each be arranged so as to be offset by 90° relative to the two Y-shaped portions of the outlet channel 31*f* of the printing nozzle head 31.

If the flowable material is now to be ejected from the ejection opening 32 of the printing nozzle head 31, the printing nozzle head 31 is brought into the lower position as the open position, see FIG. 2. The flowable material can now flow in a flow direction A, fed by the metering pump 2 at a specified constant flow rate, through the inlet opening 30*a* via the inlet channel 30*b* into the inlet ring 30*c* of the printing nozzle frame 30 and spread out there in a ring shape. Since the upper pair of sealing surfaces 30*d*, 31*d* of the printing nozzle frame 30 and the printing nozzle head 31 are obliquely spaced apart from one another in the lower position, a ring-shaped, gap-like transition region 33 is formed here, through which the flowable material can get from the inlet ring 30*c* of the printing nozzle frame 30 into the Inlet ring 31*c* of the printing nozzle head 31. From the inlet ring 31*c* of the printing nozzle head 31, the flowable material can now get to the ejection opening 32 of the printing nozzle head 31 via the ejection channel 31*h* and in the vertical direction Z downward in a flow direction B from the ejection opening 32 of the printing nozzle head 31 to the printing bed 11 or to the workpiece 4 to be printed. The ejection opening 32 of the printing nozzle head 31 can be positioned by means of the printing head kinematics 12, in particular in the vertical direction Z, in relation to the printing bed 11 or in relation to the workpiece 4 to be printed, such that the 3D printing process can be carried out. In this process, the printing head 14 can also be moved horizontally while the flowable material is being ejected, in order to form or print the workpiece 4 in a planar manner.

If the ejection of the flowable material from the ejection opening 32 of the printing nozzle head 31 to the printing bed 11 or to the workpiece 4 to be printed is to be interrupted, for example to move the printing head 14 in particular horizontally without ejecting material, the printing nozzle head 31 can be moved upward in the vertical direction Z into the closed position, see FIG. 3. During this movement, the transition region 33 between the upper pair of sealing surfaces 30*d*, 31*d* of the printing nozzle frame 30 and the printing nozzle head 31 is reduced to the same extent and finally closed, as simultaneously a corresponding transition region 33 between the lower pair of sealing surfaces 30*d*, 31*d* of the printing nozzle frame 30 and the printing nozzle head 31 is opened and increased. When the closed position is reached, the flowable material flows completely into the outlet ring 31*e* of the printing nozzle head 31 and from there via the outlet channel 31*f* and the outlet opening 31*g* of the printing nozzle head 31 in a flow direction C, for example into the previously described return line.

Due to the uniform transition of the two jointly closing and opening transition regions 33, the flow rate of the flowing material can be kept constant when changing between the open position and the closed position, and vice versa, thus avoiding pressure fluctuations in the flow of the flowing material, which, during the transition from the closed position to the open position, can ensure a uniform ejection of the flowable material from the ejection opening 32 of the printing nozzle head 31. This can prevent excessive ejection at the beginning of a printing operation, which might otherwise cause the workpiece 4 to be printed unevenly. The fact that both the ejection channel 31*h* and the outlet channel 31*f* of the printing nozzle head 31 have a comparable flow resistance for the flowable material may also facilitate this.

The movement of the printing nozzle head 31 in the vertical direction Z upward from the open position to the closed position not only causes the above-described interruption of the ejection of the flowable material from the ejection opening 32 of the printing nozzle head 31, but simultaneously causes the ejection opening 32 of the printing nozzle head 31 to be spaced apart from the printing bed 11 or from the workpiece 4 to be printed. In this way, in particular during the horizontal movement of the printing head 14, contact of the ejection opening 32 of the printing nozzle head 31 with the printing bed 11 or with the workpiece 4 to be printed can be avoided.

Figure 4:
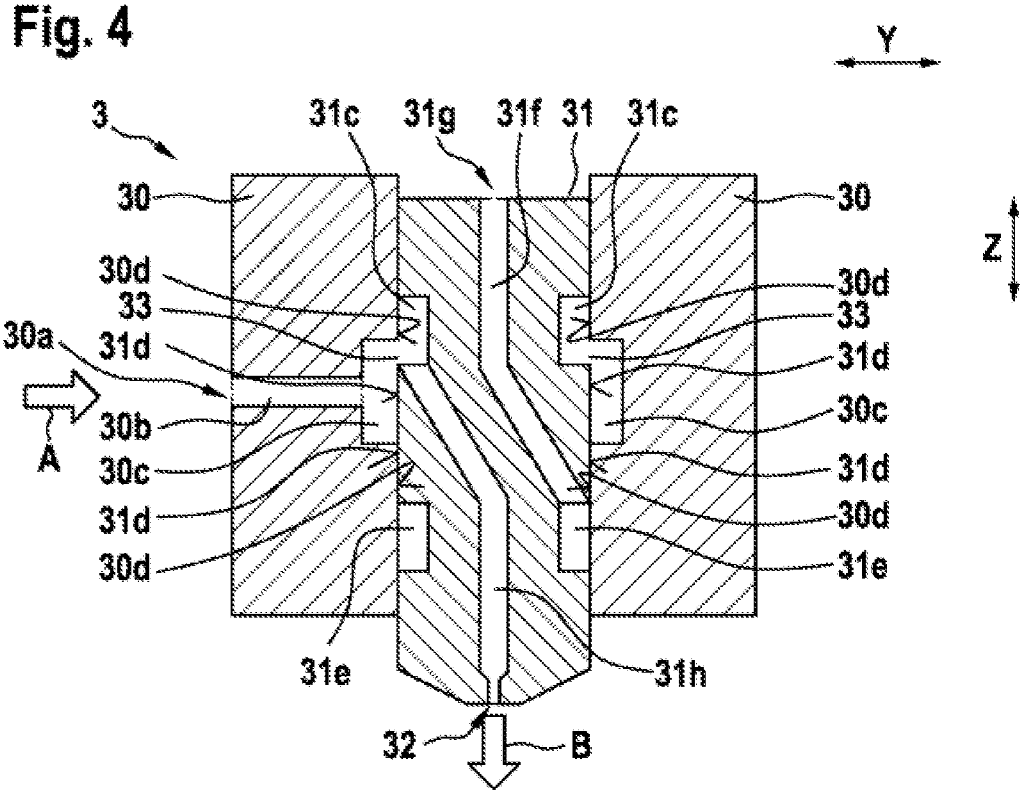
FIG. 4 is a sectional view of a printing nozzle according to the invention according to a second embodiment in the open position.
Figure 5:
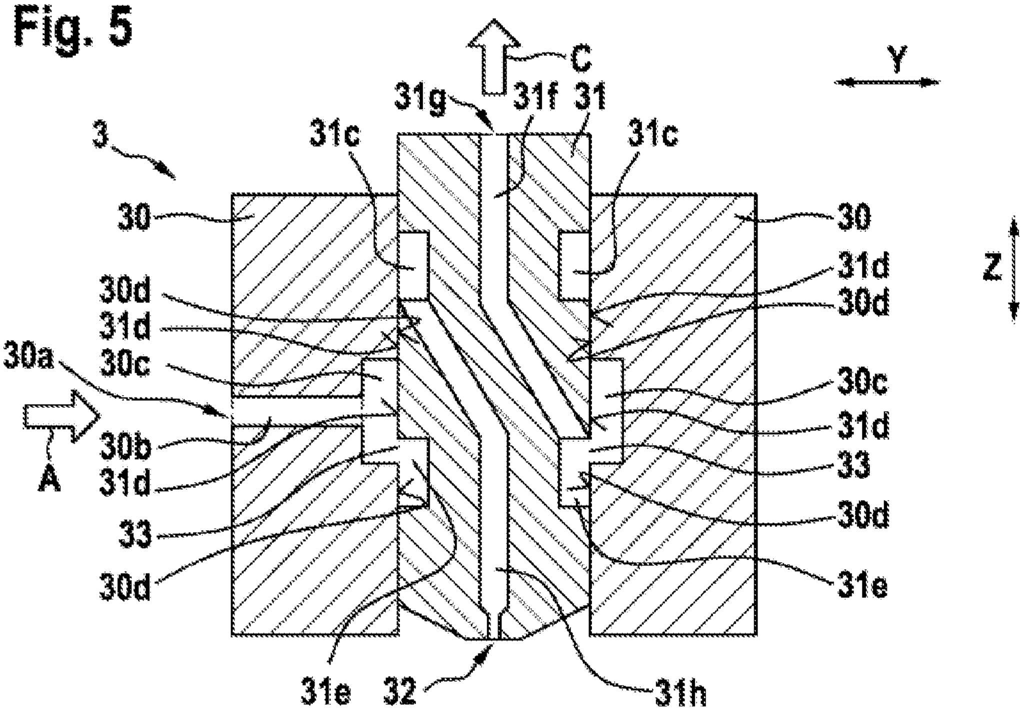
FIG. 5 is the view of FIG. 4 in the closed position.

FIG. 4 shows a sectional view of a printing nozzle 3 according to the invention according to a second embodiment in the open position. FIG. 5 shows the view of FIG. 4 in the closed position. In this case, the printing nozzle head 31 is designed completely cylindrical. As a result, the two pairs of sealing surfaces 30*d*, 31*d* of the printing nozzle frame 30 and the printing nozzle head 31 are aligned perpendicular to one another, and the transition regions 33 are designed as passage openings instead of passage channels.

Considering the first embodiment of FIGS. 2 and 3 in comparison to the second embodiment of FIGS. 4 and 5, the two conical pairs of sealing surfaces 30*d*, 31*d* of the printing nozzle frame 30 and the printing nozzle head 31 of the first embodiment in FIGS. 2 and 3 can result in better sealing, since in the second embodiment of FIGS. 4 and 5 the sealing effect can be reduced in that a sealing effect can only be achieved by the fitting combination of the printing nozzle head 31 in relation to its receptacle in the printing nozzle frame 30. The opening and closing of the transition regions 33 in the two conical pairs of sealing surfaces 30*d*, 31*d* of the printing nozzle frame 30 and the printing nozzle head 31 of the first embodiment of FIGS. 2 and 3 can take place with a shorter movement than in the second embodiment of FIGS. 4 and 5, which can accelerate the opening and closing of the transition regions 33. Furthermore, the effort required to open and close the transition regions 33 can be lower with regard to the length of the movement required and/or the energy expenditure for this purpose.

However, a disadvantage of the first embodiment of FIGS. 2 and 3 compared to the second embodiment of FIGS. 4 and 5 can be considered that the arrangement of the trapezoidal projection of the printing nozzle head 31 within the printing nozzle frame 30 can require a multi-part design of the printing nozzle frame 30, which can result in increased manufacturing and assembly costs. Also, the closing of the upper pair of sealing surfaces 30*d*, 31*d* of the printing nozzle frame 30 and the printing nozzle head 31 in the first embodiment of FIGS. 2 and 3 can result in the flowable material located in the transition region 33 possibly being unintentionally ejected by the movement of the printing nozzle head 31 via its outlet channel 31*h* and its ejection opening 32 from this opening in the vertical direction Z downward in the direction of flow B, which can result, for example, in a change in the workpiece 4. This can be prevented by designing the transition regions 33 as passage openings instead of passage channels in the second embodiment in FIGS. 4 and 5.

Figure 6:
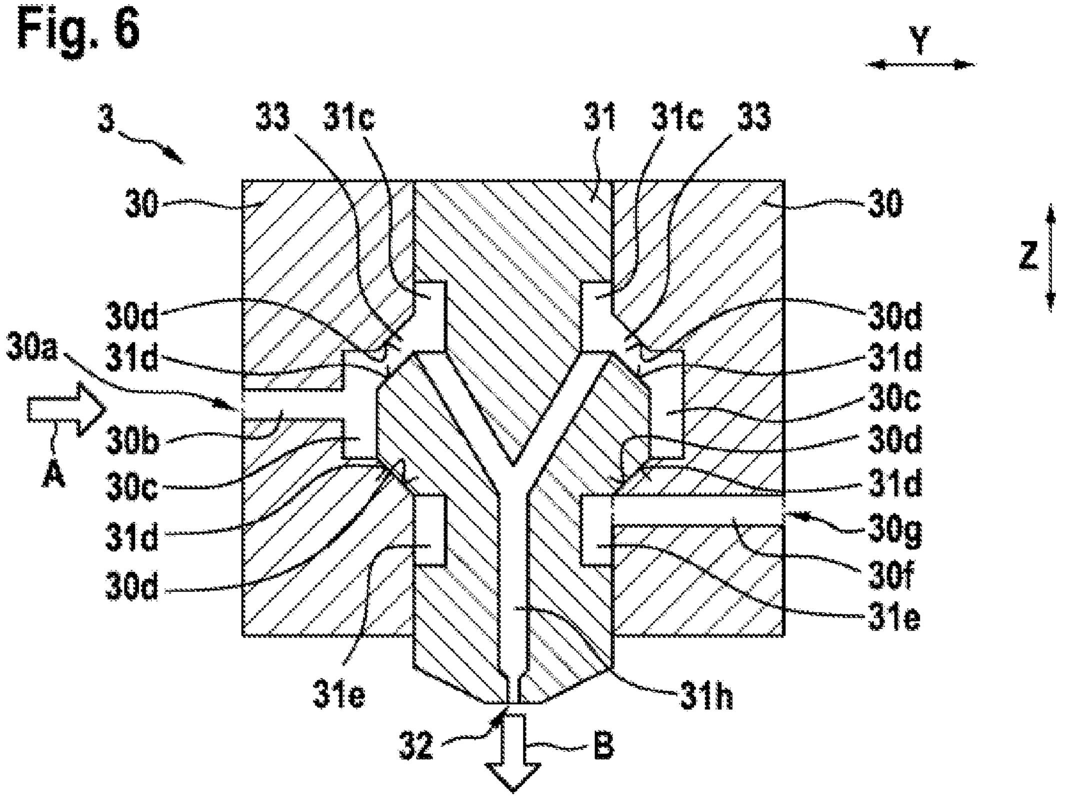
FIG. 6 is a sectional view of a printing nozzle according to the invention according to a third embodiment in the open position.
Figure 7:
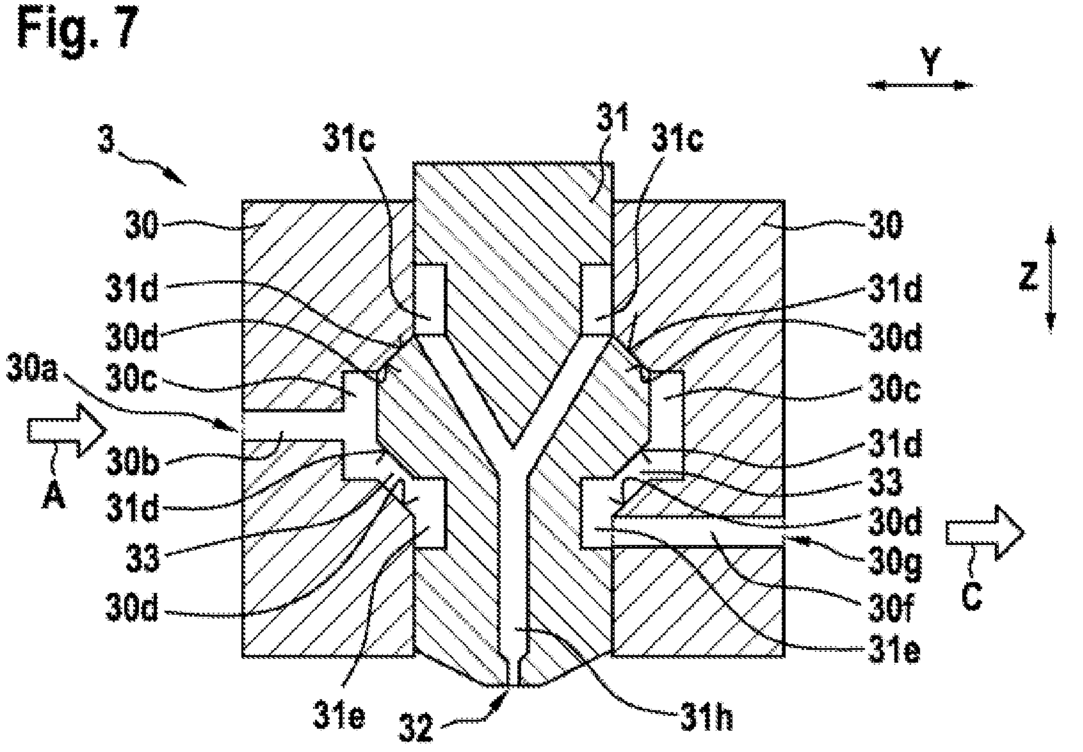
FIG. 7 is the view of FIG. 6 in the closed position.

FIG. 6 is a sectional view of a printing nozzle 3 according to the invention according to a third embodiment in the open position. FIG. 7 is the view of FIG. 6 in the closed position.

The third embodiment of FIGS. 6 and 7 corresponds to the first embodiment of FIGS. 2 and 3 with the difference that, in this case, the printing nozzle frame 30 has an outlet channel 30*f* which leads to an outlet opening 30*g* from which the flowable material can flow in the direction of flow C, e.g., into the previously described return line. The outlet channel 30*f* of the printing nozzle frame 30 is arranged pointing radially outward in the vertical direction Z at a point below the lower sealing surface 30*d* of the printing nozzle frame 30 such that, in the closed position of the printing nozzle head 31, the flowable material can get from the outlet ring 31*e* of the printing nozzle head 31 into the outlet channel 30*f* of the printing nozzle frame 30. This can represent an alternative variant for discharging the flowable material from the printing nozzle 3 in the closed position of the printing nozzle head 31.

In this case, inside the printing nozzle head 31, its ejection channel 31*h* may be formed in a Y-shape to connect the inlet ring 31*c* of the printing nozzle head 31 to the ejection opening 32 at two points. This can cause the flowable material to flow more uniformly toward the ejection opening 32 of the printing nozzle head 31. This also makes it possible to simplify the production of the printing nozzle head 31, in particular by reducing the number of bores.

Figure 8:
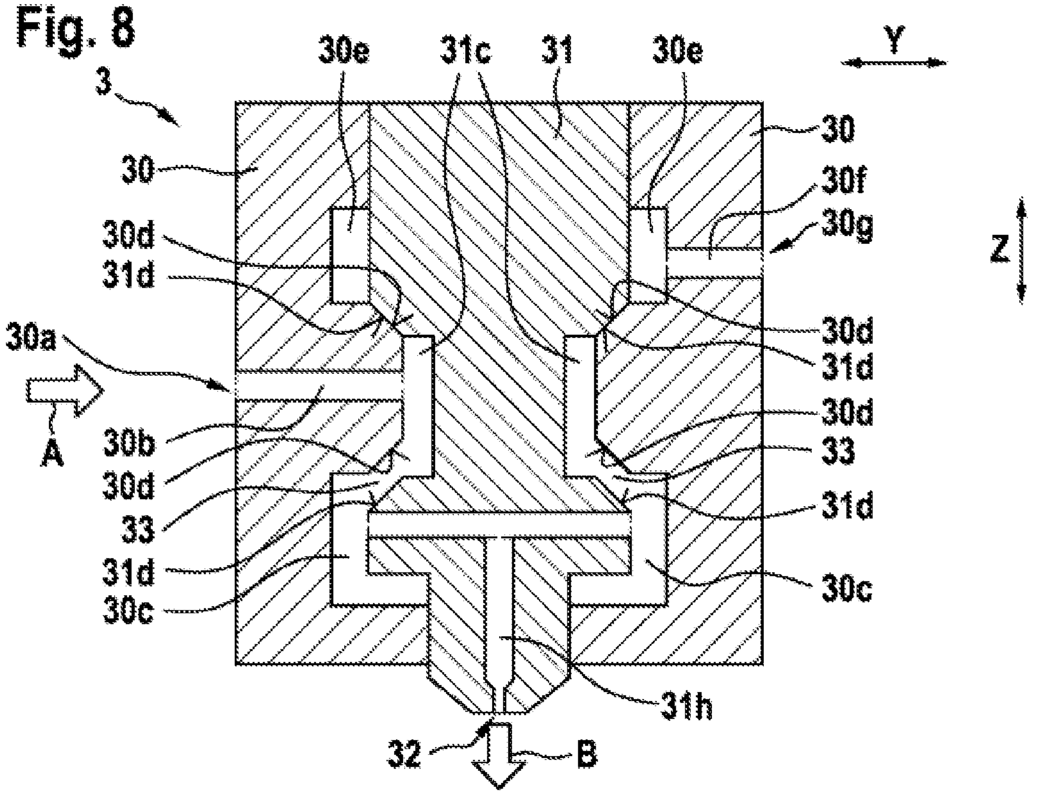
FIG. 8 is a sectional view of a printing nozzle according to the invention according to a fourth embodiment in the open position.
Figure 9:
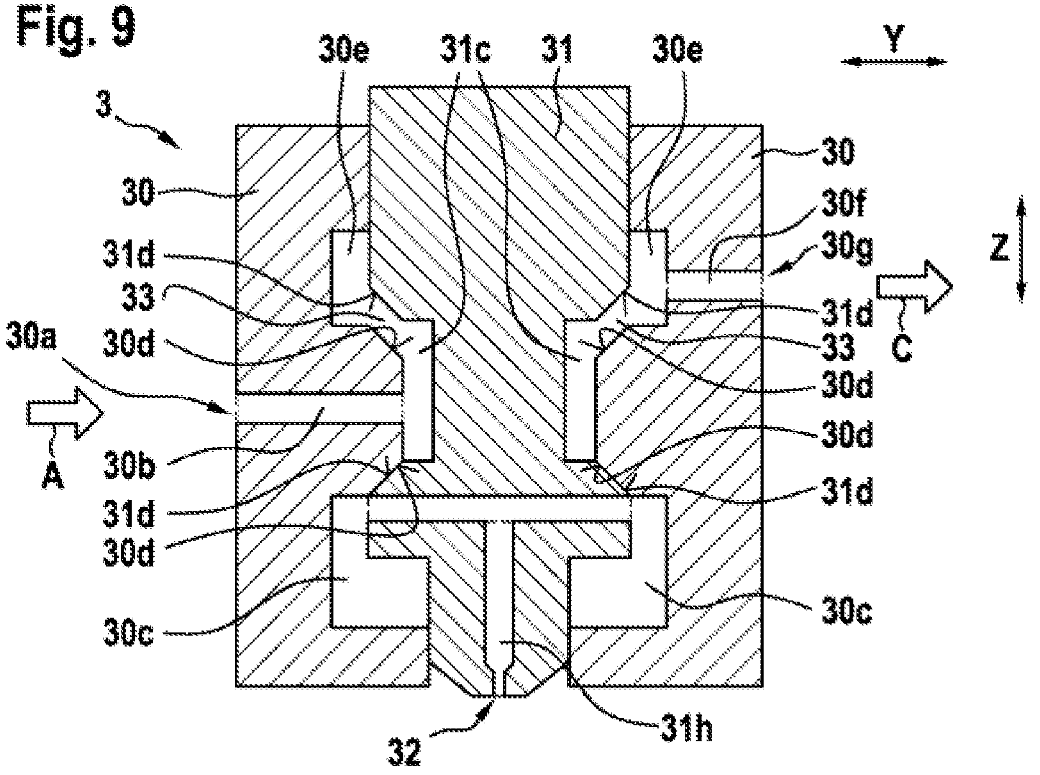
FIG. 9 is the view of FIG. 8 in the closed position.

FIG. 8 is a sectional view of a printing nozzle 3 according to a fourth embodiment in the open position. FIG. 9 is the view of FIG. 8 in the closed position.

In this case, the inlet channel 30*b* of the printing nozzle frame 30 protrudes in a trapezoidal manner toward the printing nozzle head 31, so that the sealing surfaces 30*d* of the printing nozzle frame 30 are formed in the vertical direction Z above and below the inlet channel 30*b* of the printing nozzle frame 30, each at a 45° angle. An outlet ring 30*e* of the printing nozzle frame 30 adjoins the upper sealing surface 30*d* of the printing nozzle frame 30, which extends in a closed ring shape and radially in an inwardly open manner around the printing nozzle head 31. In the view of FIGS. 8 and 9 on the right, the outlet ring 30*e* of the printing nozzle frame 30 transitions at one point into the outlet channel 30*f* of the printing nozzle frame 30, cf. the third embodiment in FIGS. 6 and 7. The lower sealing surface 30*d* of the printing nozzle frame 30 is correspondingly designed in a closed ring shape at a 45° angle below the trapezoidal projection of the printing nozzle frame 30.

The printing nozzle head 31 has a corresponding design and has the inlet channel 31*c*, which is connected to the ejection opening 32 of the printing nozzle head 31 via a T-shaped ejection channel 31*h*, as described above.

In this case, the flowable material can get into its inlet ring 30*c* via the inlet channel 30*b* of the printing nozzle frame 30, which is substantially formed by the surfaces of the printing nozzle head 31, but can be functionally assigned to the printing nozzle frame 30 for better comparison with the previous embodiments. In the open position of FIG. 8, the upper pair of sealing surfaces 30*d*, 31*d* of the printing nozzle frame 30 and the printing nozzle head 31 are in contact with one another in a planar and surface-sealing manner, and the lower pair of sealing surfaces 30*d*, 31*d* of the printing nozzle frame 30 and the printing nozzle head 31 form the transition region 33. Correspondingly, the flowable material can get from the inlet ring 30*c* of the printing nozzle frame 30 through the transition region 33 between the lower sealing surfaces 30*d*, 31*d* of the printing nozzle frame 30 and the printing nozzle head 31 into the inlet ring 31*c* of the printing nozzle head 31, which ring is not only formed in a closed ring shape around the printing nozzle head 31 but is also in the vertical direction Z between the printing nozzle frame 30 and the printing nozzle head 31. The flowable material can then get to the ejection opening 32 of the printing nozzle head 31 via the T-shaped ejection channel 31*h* of the printing nozzle head 31 and, as previously described, be ejected downward in the vertical direction Z.

If the printing nozzle head 31 is now moved upward in the vertical direction Z into the closed position, the transition region 33 between the lower sealing surfaces 30*d*, 31*d* of the printing nozzle frame 30 and the printing nozzle head 31, as described in the first embodiment in FIGS. 2 and 3, is reduced and finally closed to the same extent and at the same time as the transition region 33 between the upper sealing surfaces 30*d*, 31*d* of the printing nozzle frame 30 and the printing nozzle head 31 is opened and increased. When the closed position is reached, the flowable material can get to the outlet channel 30*f* of the printing nozzle frame 30 via the outlet ring 30*e* and be discharged from the printing nozzle 3.

The advantage of this fourth embodiment of FIGS. 8 and 9 is that in this case too a very effective seal can be achieved by the conical lower and upper sealing surfaces 30*d*, 31*d* of the printing nozzle frame 30 and the printing nozzle head 31, although this involves a higher design as well as manufacturing and assembly effort.

The advantage of the fourth embodiment of FIGS. 8 and 9 compared to the three embodiments of FIGS. 2 to 7 considered so far is that, by moving the printing nozzle head 31 in the vertical direction Z upward from the open position to the closed position, in addition to the closing of the transition region 33 between the lower sealing surfaces 30*d*, 31*d* of the printing nozzle frame 30 and the printing nozzle head 31, simultaneously an increase in the volume of the inlet ring 31*c* of the printing nozzle head 31 takes place. Thus, the flowable material, which during the closing movement from the open position to the closed position is pressed from the closing transition region 33 between the lower sealing surfaces 30*d*, 31*d* of the printing nozzle frame 30 and the printing nozzle head 31 into the inlet ring 31*c* of the printing nozzle head 31, can be at least partially or completely received by the simultaneously increasing volume of the inlet ring 31*c* of the printing nozzle head 31. This can reduce or even completely prevent an unwanted ejection of the flowable material during the closing movement. The increase of the inlet ring 31*c* of the printing nozzle head 31 can possibly be dimensioned such that the flowable material from the ejection channel 31*h* can even be partially suctioned back into the inlet ring 31*c* of the printing nozzle head 31, which can even more effectively prevent the flowable material from being ejected unintentionally during the closing movement.

It is also advantageous in the fourth embodiment that the lower pair of sealing surfaces 30*d*, 31*d* of the printing nozzle frame 30 and the printing nozzle head 31 forms the transition region 33 in the open position, which transition region feeds the flowable material to the ejection opening 32 of the printing nozzle head 31. As a result, the path of the flowable material through the printing nozzle 3 to the ejection opening 32 of the printing nozzle head 31 can be shortened. This also reduces the volume of the flowable material between the transition region 33 or between the lower pair of sealing surfaces 30*d*, 31*d* of the printing nozzle frame 30 and the printing nozzle head 31 and its ejection opening 32 in the open position and thus also the influences of pressure changes and/or thermal expansions of the flowable material located there, which could also result in an unintentional ejection of the flowable material from the ejection opening 32 of the printing nozzle head 31 in the closed position.

Figure 10:
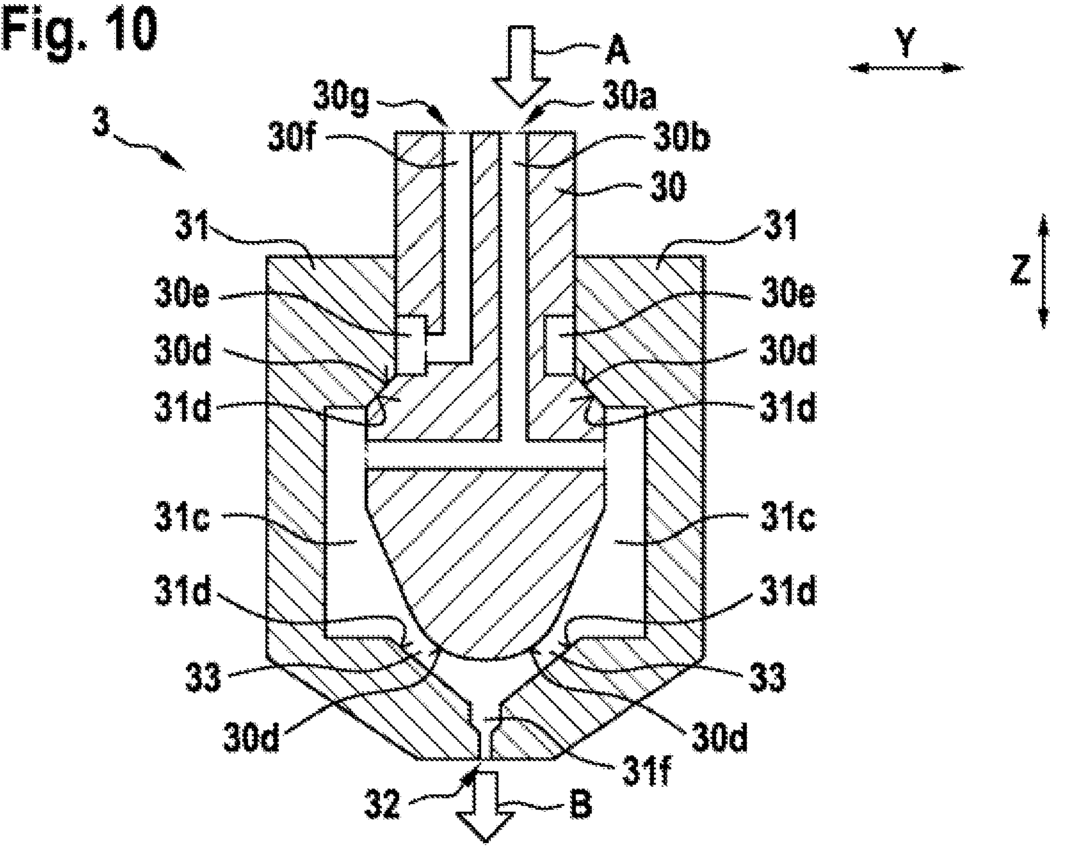
FIG. 10 is a sectional view of a printing nozzle according to the invention according to a fifth embodiment in the open position.
Figure 11:
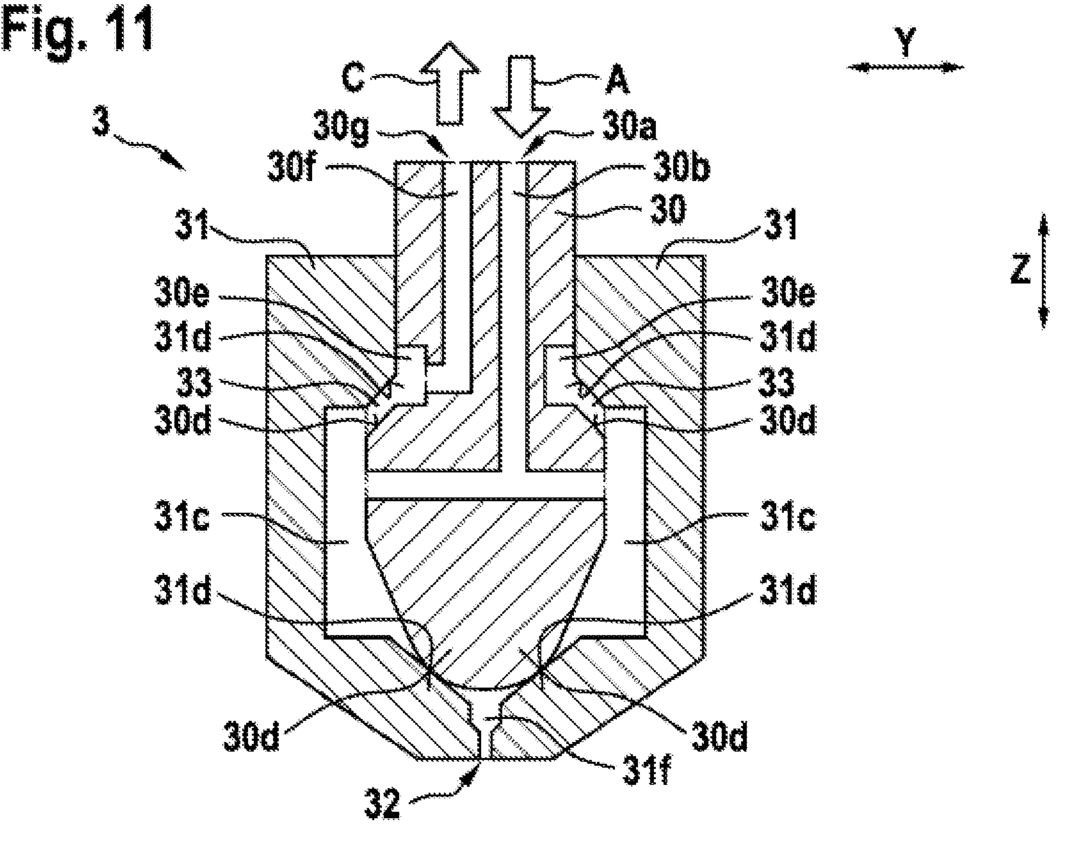
FIG. 11 is the view of FIG. 10 in the closed position.

FIG. 10 is a sectional view of a printing nozzle 3 according to the invention according to a fifth embodiment in the open position. FIG. 11 is the view of FIG. 10 in the closed position.

In contrast to the previous four embodiments, in the fifth embodiment in FIGS. 10 and 11, the stationary printing nozzle frame 30 is arranged on the inside and the printing nozzle head 31, which can be moved relative thereto in the vertical direction Z, is arranged on the outside and the printing nozzle frame 30 is arranged substantially cylindrically surrounding it. Correspondingly, the inlet channel 30*b* initially leads perpendicularly in the vertical direction Z from above into the printing nozzle frame 30 and then branches out in a T-shape in the horizontal direction Y.

Parallel to this, the outlet channel 30*f* of the printing nozzle frame 30 extends upward in the vertical direction Z, said outlet channel being connected at one point to the outlet ring 30*e* of the printing nozzle frame 30 which is a closed ring shape and is open radially outward.

In the vertical direction Z downward, the printing nozzle frame 30 is designed conically and rounded at the tip (not designated). In the region of the rounded tip, the printing nozzle frame 30 is surrounded by the printing nozzle head 31 such that the inlet ring 31*c* of the printing nozzle head 31 is formed there. Near the rounded tip of the conical lower end of the printing nozzle frame 30, the lower pair of sealing surfaces 30*d*, 31*d* of the printing nozzle frame 30 and the printing nozzle head 31 are formed, which is followed by the ejection channel 31*h* of the printing nozzle head 31 and then, on the side of the printing nozzle head 31, the ejection opening 32. This results in a minimum volume of the ejection channel 31*h* of the printing nozzle head 31.

At the upper end of the inlet ring 31*c* of the printing nozzle head 31, the upper pair of sealing surfaces 30*d*, 31*d* of the printing nozzle frame 30 and of the printing nozzle head 31 is designed conically, comparable to the first, third, and fourth embodiments of FIGS. 2 and 3, FIGS. 6 and 7, as well as FIGS. 8 and 9 before.

In this case, the flowable material can flow through the inlet channel 30*b* of the printing nozzle frame 30 into the inlet ring 31*c* of the printing nozzle head 31 both in the open position of FIG. 10 and in the closed position of FIG. 11. In the open position of FIG. 10, the upper sealing surfaces 30*d*, 31*d* of the printing nozzle frame 30 and the printing nozzle head 31 are in planar, conical contact with one another and thereby close the outlet channel 30*f* of the printing nozzle frame 30. Simultaneously, the lower sealing surfaces 30*d*, 31*d* of the printing nozzle frame 30 and the printing nozzle head 31 are spaced apart from one another and form a transition region 33 that extends in a ring shape around the rounded cone tip of the printing nozzle frame 30 designed as a passage opening through which the flowable material can get to the ejection opening 32 of the pressure nozzle head 31 via the short ejection channel 31*h*, and can be ejected there as previously described.

In the closed position, the lower sealing surfaces 30*d*, 31*d* of the printing nozzle frame 30 and the printing nozzle head 31 are in contact with one another. Simultaneously, comparable to that described above, a transition region 33 is formed between the upper sealing surfaces 30*d*, 31*d* of the printing nozzle frame 30 and the printing nozzle head 31, so that the flowable material can flow via the outlet ring 30*e* into the outlet channel 30*f* of the printing nozzle frame 30.

The ejection channel 31*h* of the printing nozzle head 31 has such a small volume that the influence of pressure changes and/or thermal expansion on the flowable material located there can be so small that the flowable material is not expected to be unintentionally ejected from the ejection opening 32 of the printing nozzle head 31 in the closed position. Disadvantageously, however, the closing movement can result in an ejection of flowable material.

Figure 12:
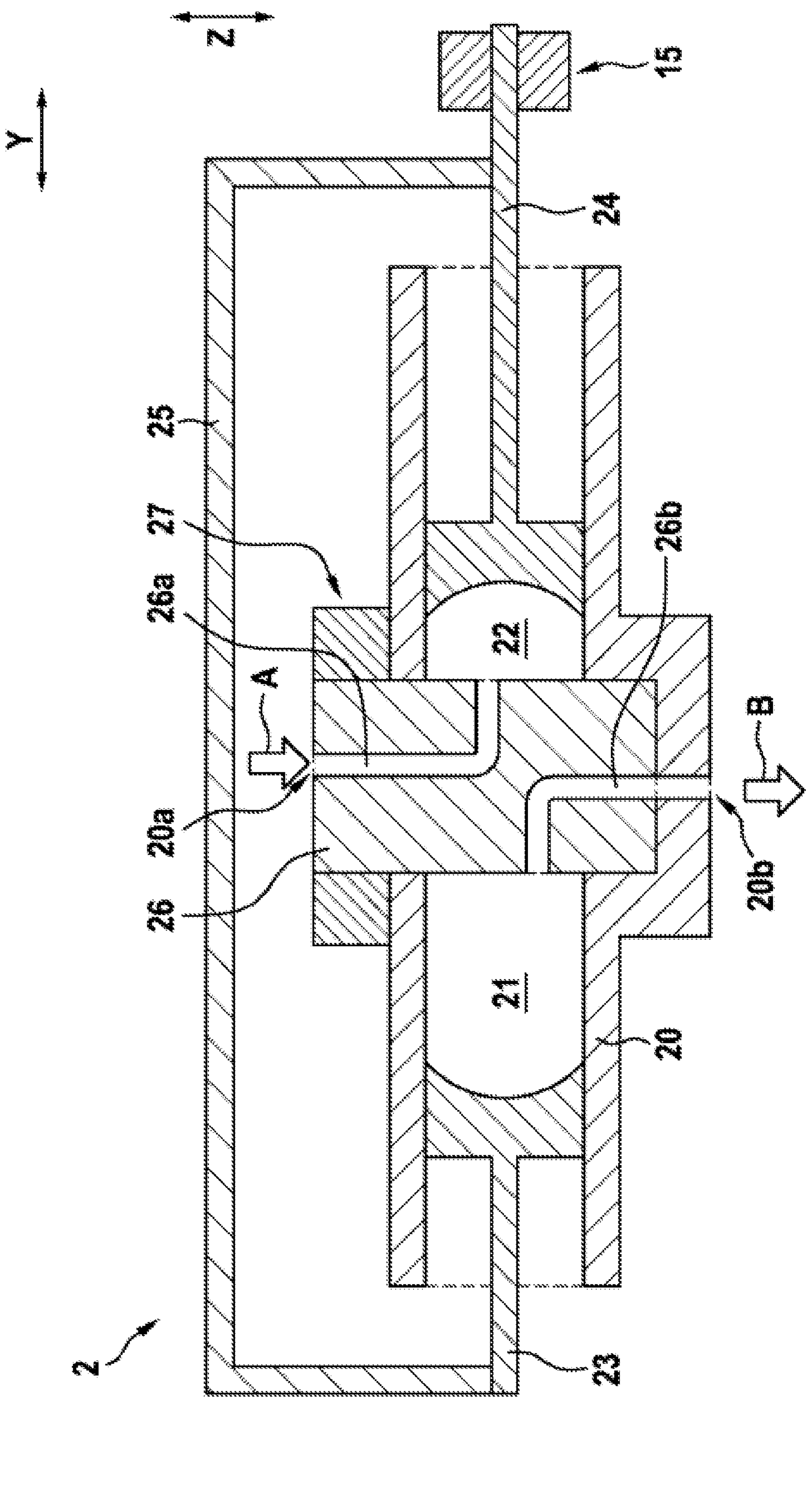
FIG. 12 is a sectional view of a metering pump according to the invention.

FIG. 12 shows a sectional view of a metering pump 2 according to the invention. The metering pump 2 is implemented as a piston conveyor 2. The metering pump 2 has an inlet opening 20*a* and an outlet opening 20*b*. The flowable material can get to the metering pump 2 from the heating hose 18 and from the return line (not shown) via the inlet opening 20*a* and be delivered to the printing nozzle 3 at a specified constant conveying speed via the outlet opening 20*b*.

The metering pump 2 has a metering pump housing 20, which extends substantially in the horizontal direction Y and has the outlet opening 20*b* pointing downward in the vertical direction Z. Two through-openings (not designated) are formed laterally in the horizontal direction Yin the metering pump housing 20, which each receive a piston 23, 24 movable in the horizontal direction Y from the outside. Centered in the horizontal direction Y, and in the vertical direction Z from above, the metering pump housing 20 accommodates a cylindrical valve element 26 in the form of a rotary valve 26 which can be rotated back and forth about its vertical axis by at least 180°. A first chamber volume 21 is enclosed within the metering pump housing 20 by the valve element 26 and the left piston 23, and a second chamber volume 22 is enclosed by the valve element 26 and the right piston 24.

The valve element 26 has the inlet opening 20*a* on the top in the vertical direction Z, which is followed by an inlet channel 26*a* extending first perpendicularly downward and then, in the view of FIG. 12, to the right. An outlet channel 26*b* extends, in the view of FIG. 12, first horizontally and then downward in the vertical direction Z, where the outlet channel 26*b* merges into the outlet opening 20*b*. In the view of FIG. 12, the first chamber volume 21 is connected to the outlet opening 20*b* of the metering pump 2 via the outlet channel 26*b* of the valve element 26, so that flowable material received there can be released from the metering pump 2 to the printing nozzle 3. Simultaneously, the second chamber volume 22 is connected to the inlet opening 20*a* of the metering pump 2 via the inlet channel 26*a* of the valve element 26, so that flowable material can get from the heating hose 18 into the second chamber volume 22 and be received there. By turning the valve element 26 by means of a valve drive 27, this can be done in reverse with regard to the two chamber volumes 21, 22.

The two pistons 23, 24 are connected to one another in a fixed manner outside the two chamber volumes 21, 22 by means of a piston linkage 25 in the form of a tie rod 25, so that the two pistons 23, 24 can only be moved jointly in the same direction in the horizontal direction Y. The sum of the two chamber volumes 21, 22 is therefore constant. The two coupled pistons 23, 24 can be moved by means of the piston drive 15 already mentioned. On the other hand, the flowable material flowing into the second chamber volume 22, for example, can additionally push the corresponding piston 24 outward or in the horizontal direction Y to the right, so that the piston drive 15 is partially relieved by this force. Both forces pull the opposite piston 23 of the first chamber volume 21 toward the valve element 26, as a result of which the flowable material located in the first chamber volume 21 is conveyed into the outlet channel 26*b*.

LIST OF REFERENCE SIGNS (PART OF THE DESCRIPTION)

A Flow direction of the inflowing flowable material
B Flow direction of the outflowing flowable material
C Flow direction of the returning flowable material
Y Horizontal direction;
Z Vertical direction;
1 Printing device; 3D printer
10 Frame; rack
11 (horizontal) work surface; printing bed
12 Printing head kinematics
13 Printing head holder
14 Printing head
15 Piston drive of the metering pump 2

16 Plasticizing unit; plasticizer
16*a* Funnel of the plasticizing unit 16
16*b* Screw of the plasticizing unit 16
16*b* Ejection opening or nozzle opening of the plasticizing unit 16
17 Material store
18 (Hose-like) material guide element; heating hose
2 Metering pump; piston conveyor
20 Metering pump housing
20*a* Inlet opening of the metering pump 2
20*b* Outlet opening of the metering pump 2
21 First chamber volume
22 Second chamber volume
23 Piston of the first chamber volume 21
24 Piston of the second chamber volume 22
25 Piston linkage; tie rod
26 Valve element; rotary valve
26*a* Inlet channel of the valve element 26
26*b* Outlet channel of the valve element 26
27 Valve drive
3 Printing nozzle; nozzle
30 Printing nozzle frame; nozzle body
30*a* Inlet opening of the printing nozzle frame 30
30*b* Inlet channel of the printing nozzle frame 30
30*c* Inlet ring of the printing nozzle frame 30
30*d* Sealing surfaces of the printing nozzle frame 30
30*e* Outlet ring of the printing nozzle frame 30
30*f* Outlet channel of the printing nozzle frame 30
30*g* Outlet opening of the printing nozzle frame 30
31 Printing nozzle head; nozzle needle
31*c* Inlet ring of the printing nozzle head 31
31*d* Sealing surfaces of the printing nozzle head 31
31*e* Outlet ring of the printing nozzle head 31
31*f* Outlet channel of the printing nozzle head 31
31*g* Outlet opening of the printing nozzle head 31
31*h* Ejection channel
32 Ejection opening; nozzle opening
33 Transition region
4 Workpiece

The invention claimed is:

1. A printing device comprising at least one printing nozzle configured to eject a flowable material through at least one ejection opening in a direction of a work surface, wherein the printing nozzle has a stationary printing nozzle frame, the printing nozzle frame comprising an outlet opening and a printing nozzle head comprising the ejection opening, which printing nozzle head can be moved relative to the printing nozzle frame, wherein the printing nozzle is designed to move the printing nozzle head relative to the printing nozzle frame between an open position, in which a flow of the flowable material through the ejection opening is permitted and the flowable material is not permitted to flow through the outlet opening, and a closed position, in which a flow of the flowable material through the ejection opening is not permitted and the flowable material is permitted to flow through the outlet opening, by means of a drive, wherein the ejection opening of the printing nozzle head is spaced apart further from the work surface in the closed position than in the open position and wherein the printing nozzle frame has at least two upper sealing surfaces and two lower sealing surfaces and the printing nozzle head has at least two upper sealing surfaces and two lower sealing surfaces, wherein the at least two upper sealing surfaces of the printing nozzle frame and the at least two upper sealing surfaces of the printing nozzle head are formed opposite one another to form an upper pair, wherein the at least two lower sealing surfaces of the printing nozzle frame and the at least two lower sealing surfaces of the printing nozzle head are formed opposite one another to form a lower pair, such that, in the open position, the at least two lower sealing surfaces of the printing nozzle frame and the at least two lower sealing surfaces of the printing nozzle head are spaced apart from one another and form a transition region therebetween through which the flowable material is permitted to flow toward the ejection opening, and the at least two upper sealing surfaces of the printing nozzle frame and the at least two upper sealing surfaces of the printing nozzle head form a seal together so that the flowable material is not permitted to flow toward the outlet opening, and, in the closed position, the at least two lower sealing surfaces of the printing nozzle frame and the at least two lower sealing surfaces of the printing nozzle head form a seal together so that the flowable material is not permitted to flow toward the ejection opening, and the at least two upper sealing surfaces of the printing nozzle frame and the at least two upper sealing surfaces of the printing nozzle head are spaced apart from one another and form a transition region therebetween, through which the flowable material is permitted to flow toward the outlet opening.

2. Printing device according to claim 1, characterized in that the at least two upper sealing surfaces of the printing nozzle frame and the at least two upper sealing surfaces of the printing nozzle head are each designed to touch one another in a planar or linear manner in a direction of movement or at an angle or at right angles to the direction of movement of the printing nozzle head relative to the printing nozzle frame.

3. Printing device according to claim 1, characterized by at least one receiving space which is designed to receive the flowable material from the outlet opening of the printing nozzle, and/or at least one return line of a printing head, which is designed to receive the flowable material from the outlet opening of the printing nozzle and to feed it to an inlet opening of the printing nozzle.

4. Printing device according to claim 1, characterized in that the transition regions between the upper pair and the lower pair are each designed to keep the flow of the flowable material constant.

5. Printing device according to claim 1, characterized in that the printing nozzle frame and/or the printing nozzle head has/have at least substantially the same flow resistance for the flowable material between the transition region formed in the open position between the printing nozzle frame and the printing nozzle head and the outlet opening, and between the transition region formed in the closed position between the printing nozzle frame and the printing nozzle head and the ejection opening.

6. Printing device according to claim 1, characterized in that the ejection opening is designed to be narrowed.

7. Printing device according to claim 1, characterized by at least one metering pump which is designed to have the flowable material fed through an inlet opening and to feed the flowable material through an outlet opening of the metering pump to the printing nozzle, wherein the metering pump has at least a first chamber volume and a second chamber volume, each of which can be alternatively connected to the inlet opening or to the outlet opening of the metering pump to convey the flowable material.

8. Printing device according to claim 7, characterized in that the two chamber volumes are arranged in a straight line opposite one another, wherein the two chamber volumes are separated from one another by a valve element, wherein the two chamber volumes are each delimited by a respective piston, wherein the two pistons are fixedly connected to one another by means of a piston linkage in order to be translationally moved together in a same direction.

9. Printing device according to claim 8, characterized in that the two pistons are designed to be translationally moved together in the same translatory direction by means of a piston drive and by means of a pressure of the flowable material.

10. Printing device according to claim 8, characterized in that the valve element is designed to be rotated by means of a valve drive perpendicular to the translatory direction of movement of the two pistons.

11. Printing device according to claim 8, characterized in that the piston linkage is arranged outside the two chamber volumes.

12. Printing device according to claim 1, characterized by at least one plasticizing unit comprising at least one plasticizer, which is arranged stationary relative to the printing nozzle and is designed to produce the flowable material, wherein the plasticizing unit is connected to the printing nozzle by means of at least one material guide element which is designed to convey the flowable material, wherein the material guide element is designed to be heatable.

13. The printing device of claim 1, wherein the printing device is a 3D printer.

* * * * *